(12) United States Patent
Zhang et al.

(10) Patent No.: US 11,096,185 B2
(45) Date of Patent: Aug. 17, 2021

(54) CHANNEL QUALITY INFORMATION TRANSMISSION METHOD AND SYSTEM, APPARATUS, AND STORAGE MEDIUM

(71) Applicant: Huawei Technologies Co., Ltd., Shenzhen (CN)

(72) Inventors: Di Zhang, Beijing (CN); Jianqin Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/688,670

(22) Filed: Nov. 19, 2019

(65) Prior Publication Data

US 2020/0092894 A1 Mar. 19, 2020

Related U.S. Application Data

(63) Continuation of application No. PCT/CN2018/095469, filed on Jul. 12, 2018.

(30) Foreign Application Priority Data

Nov. 17, 2017 (CN) .......................... 201711147859.5

(51) Int. Cl.
*H04W 72/00* (2009.01)
*H04W 72/08* (2009.01)
(Continued)

(52) U.S. Cl.
CPC ......... *H04W 72/085* (2013.01); *H04L 1/0003* (2013.01); *H04L 5/0051* (2013.01);
(Continued)

(58) Field of Classification Search
CPC . H04W 72/085; H04W 72/046; H04W 72/10; H04L 1/0003; H04L 5/0051; H04L 5/10
See application file for complete search history.

(56) References Cited

U.S. PATENT DOCUMENTS 9,532,362 B2 * 12/2016 Marinier .............. H04B 7/0617
9,674,753 B2 * 6/2017 He ........................ H04W 16/24
(Continued)

FOREIGN PATENT DOCUMENTS

CN 102013954 A 4/2011
CN 108810967 A 11/2018
(Continued)

OTHER PUBLICATIONS

Huawei, HiSilicon (Details of CSI reporting on PUCCH/PUSCH)., 3GPP TSG RAN WG1 Meeting NR#3, Nagoya, Japan, Sep. 18-21, 2017 (Year: 2017).*
(Continued)

*Primary Examiner* — Khai M Nguyen
(74) *Attorney, Agent, or Firm* — Leydig, Voit & Mayer, Ltd.

(57) ABSTRACT

A channel quality information transmission method and system are described. A terminal device determines a reporting priority of channel quality information according to a reporting priority rule when reporting of first channel quality information conflicts with reporting of second channel quality information. The device further determines to-be-reported content or to-be-discarded content based on the reporting priority of the channel quality information. The terminal device reports the to-be-reported content to a network device.

18 Claims, 6 Drawing Sheets

(51) Int. Cl.
*H04L 1/00* (2006.01)
*H04L 5/00* (2006.01)
*H04L 5/10* (2006.01)
*H04W 72/04* (2009.01)
*H04W 72/10* (2009.01)

(52) U.S. Cl.
CPC ............. *H04L 5/10* (2013.01); *H04W 72/046* (2013.01); *H04W 72/10* (2013.01)

(56) References Cited

U.S. PATENT DOCUMENTS

| | | | |
|---|---|---|---|
| RE48,327 E * | 11/2020 | Yang | H04W 24/10 |
| 2012/0314613 A1 * | 12/2012 | Zhang | H04B 7/0619 370/252 |
| 2012/0327785 A1 | 12/2012 | Zhang et al. | |
| 2014/0092787 A1 * | 4/2014 | Han | H04J 3/1694 370/280 |
| 2014/0198682 A1 * | 7/2014 | Ko | H04B 7/0626 370/252 |
| 2016/0242060 A1 | 8/2016 | Kakishima et al. | |
| 2017/0237478 A1 | 8/2017 | Kwak et al. | |
| 2017/0257156 A1 | 9/2017 | Ko et al. | |

FOREIGN PATENT DOCUMENTS

| | | | | |
|---|---|---|---|---|
| EP | 2528245 A1 | * | 11/2012 | ........... H04B 7/0486 |
| EP | 2528245 A1 | | 11/2012 | |
| EP | 3442256 A1 | | 2/2019 | |
| WO | 2017138750 A1 | | 8/2017 | |
| WO | 2017175818 A1 | | 10/2017 | |

OTHER PUBLICATIONS

"Details of CSI reporting on PUCCH/PUSCH," 3GPP TSG RAN WG1 Meeting NR#3, Nagoya, Japan, R1-1715466, XP051338934, pp. 1-10, 3rd Generation Partnership Project, Valbonne, France (Sep. 18-21, 2017).

3GPP TSG RAN WG1 Meeting NR#3,R1-1715466,Details of CSI reporting on PUCCH/PUSCH,Huawei, HiSilicon, Nagoya, Japan, Sep. 18-21, 2017,total 9 pages.

"Periodic CQI/PMI/RI reporting for CA," 3GPP TSG RAN WG1 Meeting #63, Jacksonville, Florida, USA, R1-105833, pp. 1-5, 3rd Generation Partnership Project, Valbonne, France (Nov. 15-19, 2010).

* cited by examiner

CHANNEL QUALITY INFORMATION TRANSMISSION METHOD AND SYSTEM, APPARATUS, AND STORAGE MEDIUM

CROSS-REFERENCE TO RELATED APPLICATIONS

This application is a continuation of International Application No. PCT/CN2018/095469, filed on Jul. 12, 2018, which claims priority to Chinese Patent Application No. 201711147859.5, filed on Nov. 17, 2017. The disclosures of the aforementioned applications are hereby incorporated by reference in their entireties.

TECHNICAL FIELD

This application relates to the field of communications technologies, and in particular, to a channel quality information transmission method and system, an apparatus, and a storage medium.

BACKGROUND

A communications system usually includes a terminal device and a network device. Data transmission may be performed between the terminal device and the network device by using a beamforming technology. The terminal device may perform channel quality measurement based on a reference signal to obtain channel quality information, and report the channel quality information to the network device, so that the network device schedules the terminal device based on the channel quality information. Usually, the terminal device may obtain different content types of channel quality information through channel quality measurement, and the different content types of channel quality information may include, for example, channel state information (CSI) and/or beam state information (BSI). The terminal device may report the different content types of channel quality information to the network device by using a physical uplink control channel (PUCCH) or a physical uplink shared channel (PUSCH).

Currently, the terminal device usually configures the different content types of channel quality information on different time-frequency resources of the PUCCH, and reports the different content types of channel quality information to the network device by using different reporting rules. For example, the terminal device configures the CSI and the BSI on the different time-frequency resources of the PUCCH, reports the BSI to the network device by using a periodic reporting rule, and reports the CSI to the network device by using an aperiodic reporting rule, or reports the BSI and the CSI to the network device by using different periodic reporting rules.

However, in a process of reporting the channel quality information by using the foregoing solution, the different content types of channel quality information may collide with each other on the PUCCH (to be specific, the different content types of channel quality information may need to be simultaneously reported). In this case, a total quantity of time-frequency resources occupied by the different content types of channel quality information may exceed a maximum carrying capacity of the PUCCH, and consequently reliability of reporting channel quality information is relatively low.

SUMMARY

This application provides a channel quality information transmission method and system, an apparatus, and a storage medium, to resolve a problem of relatively low reliability of reporting channel quality information. The technical solutions in this application are as follows:

According to a first aspect, a channel quality information transmission method is provided, including: determining, by a terminal device, a reporting priority of channel quality information according to a reporting priority rule when reporting of first channel quality information conflicts with reporting of second channel quality information, where the channel quality information includes the first channel quality information and the second channel quality information, and the channel quality information indicates channel quality; determining, by the terminal device, to-be-reported content or to-be-discarded content based on the reporting priority of the channel quality information; and reporting, by the terminal device, the to-be-reported content to a network device; where the reporting priority rule includes: when the first channel quality information and the second channel quality information are the same in terms of time domain type and are different in terms of content type, determining the reporting priority of the channel quality information based on a content type of the channel quality information and/or a channel quality level; or when the first channel quality information and the second channel quality information are different in terms of time domain type and are the same or different in terms of content type, determining the reporting priority of the channel quality information based on a time domain type of the channel quality information and/or a channel quality level.

Optionally, before the reporting, by the terminal device, the to-be-reported content to a network device, the method further includes: determining, by the terminal device, a coding scheme and/or a modulation scheme for channel quality information in the to-be-reported content based on a channel quality level indicated by the channel quality information; and coding, by the terminal device, the channel quality information in the to-be-reported content based on the coding scheme; and/or modulating, by the terminal device, the channel quality information in the to-be-reported content based on the modulation scheme; where a coding bit rate of channel quality information indicating high channel quality is less than or equal to a coding bit rate of channel quality information indicating low channel quality; and/or a distance between a time-frequency resource on which the channel quality information indicating high channel quality is located and a time-frequency resource on which a demodulation reference signal DMRS is located is less than or equal to a distance between a time-frequency resource on which the channel quality information indicating low channel quality is located and the time-frequency resource on which the DMRS is located.

According to a second aspect, a channel quality information transmission method is provided, including: receiving, by a network device, to-be-reported content reported by a terminal device, where the to-be-reported content is reported by the terminal device to the network device after the terminal device determines a reporting priority of channel quality information according to a reporting priority rule when reporting of first channel quality information conflicts with reporting of second channel quality information, and determines the to-be-reported content or to-be-discarded content based on the reporting priority of the channel quality information, the channel quality information includes the first channel quality information and the second channel quality information, and the channel quality information indicates channel quality; and parsing, by the network device, the to-be-reported content; where the reporting priority rule includes: when the first channel quality information and the second channel quality information are the same in terms of time domain type and are different in terms of content type, determining the reporting priority of the channel quality information based on a content type of the channel quality information and/or a channel quality level; or when the first channel quality information and the second channel quality information are different in terms of time domain type and are the same or different in terms of content type, determining the reporting priority of the channel quality information based on a time domain type of the channel quality information and/or a channel quality level.

Optionally, before the parsing, by the network device, the to-be-reported content, the method further includes: determining, by the network device, a coding scheme and/or a modulation scheme for channel quality information in the to-be-reported content; and demodulating, by the network device, the channel quality information in the to-be-reported content based on the modulation scheme; and/or decoding, by the network device, the channel quality information in the to-be-reported content based on the coding scheme; where a coding bit rate of channel quality information indicating high channel quality is less than or equal to a coding bit rate of channel quality information indicating low channel quality; and/or a distance between a time-frequency resource on which the channel quality information indicating high channel quality is located and a time-frequency resource on which a demodulation reference signal DMRS is located is less than or equal to a distance between a time-frequency resource on which the channel quality information indicating low channel quality is located and the time-frequency resource on which the DMRS is located.

Optionally, in the first aspect and the second aspect, a content type of at least one of the first channel quality information or the second channel quality information is a first type.

Optionally, in the first aspect and the second aspect, the content type includes a first type and a second type; channel quality information whose content type is the first type includes at least one of an identifier of a reference signal resource or quality information of the reference signal resource, wherein the quality information of the reference signal resource includes at least one of a reference signal received power, reference signal received quality, or a channel quality indicator; and channel quality information whose content type is the second type includes at least one of an identifier of a reference signal resource, a rank indicator, a precoding matrix indicator, or a channel quality indicator.

Optionally, in the first aspect and the second aspect, the time domain type includes at least one of periodic reporting, semi-periodic reporting, or aperiodic reporting.

Optionally, in the first aspect and the second aspect, the first channel quality information includes N pieces of channel quality information whose content type is the first type, the N pieces of channel quality information include X pieces of channel quality information and Y pieces of channel quality information, and channel quality indicated by any one of the X pieces of channel quality information is higher than or equal to channel quality indicated by any one of the Y pieces of channel quality information, where X+Y≤N, and X, Y, and N all are integers greater than or equal to 1; and the second channel quality information includes M pieces of channel quality information whose content type is the first type, the M pieces of channel quality information include V pieces of channel quality information and Q pieces of channel quality information, and channel quality indicated by any one of the V pieces of channel quality information is higher than or equal to channel quality indicated by any one of the Q pieces of channel quality information, where V+Q≤M, and V, Q, and M all are integers greater than or equal to 1; or the second channel quality information includes K pieces of channel quality information whose content type is the second type, where K is an integer greater than or equal to 1.

Optionally, in the first aspect and the second aspect, when the first channel quality information and the second channel quality information are the same in terms of time domain type and are different in terms of content type, a reporting priority of the first type of the X pieces of channel quality information is higher than or equal to a reporting priority of the second type of the second channel quality information, and the reporting priority of the second type of the second channel quality information is higher than or equal to a reporting priority of the first type of the Y pieces of channel quality information; or a reporting priority of the first type of the X pieces of channel quality information is higher than or equal to a reporting priority of the first type of the Y pieces of channel quality information, and the reporting priority of the first type of the Y pieces of channel quality information is higher than or equal to a reporting priority of the second type of the second channel quality information.

Optionally, in the first aspect and the second aspect, when the first channel quality information and the second channel quality information are different in terms of time domain type and content type, a reporting priority of the first type of the first channel quality information reported aperiodically is higher than or equal to a reporting priority of the second type of the second channel quality information reported periodically; and/or a reporting priority of the second type of the second channel quality information reported aperiodically is higher than or equal to a reporting priority of the first type of the first channel quality information reported periodically; and/or the reporting priority of the first type of the first channel quality information reported aperiodically is higher than or equal to a reporting priority of the second type of the second channel quality information reported semi-periodically; and/or the reporting priority of the second type of the second channel quality information reported aperiodically is higher than or equal to a reporting priority of the first type of the first channel quality information reported semi-periodically.

Optionally, in the first aspect and the second aspect, when the first channel quality information and the second channel quality information are different in terms of time domain type and are the same in terms of content type, a reporting priority of the first type of the first channel quality information reported aperiodically is higher than or equal to a reporting priority of the first type of the first channel quality information reported periodically; and/or the reporting priority of the first type of the first channel quality information reported aperiodically is higher than or equal to a reporting priority of the first type of the first channel quality information reported semi-periodically; and/or the reporting priority of the first type of the first channel quality information reported semi-periodically is higher than or equal to the reporting priority of the first type of the first channel quality information reported periodically; and/or a reporting priority of the first type of the Y pieces of channel quality information reported aperiodically is higher than or equal to a reporting priority of the first type of the Q pieces of channel quality information reported periodically; and/or the reporting priority of the first type of the Y pieces of channel quality information reported aperiodically is higher than or equal to a reporting priority of the first type of the Q pieces of channel quality information reported semi-periodically; and/or a reporting priority of the first type of the Y pieces of channel quality information reported semi-periodically is higher than or equal to the reporting priority of the first type of the Q pieces of channel quality information reported periodically; and/or a reporting priority of the first type of the X pieces of channel quality information reported aperiodically is higher than or equal to a reporting priority of the first type of the V pieces of channel quality information reported periodically; and/or the reporting priority of the first type of the X pieces of channel quality information reported aperiodically is higher than or equal to a reporting priority of the first type of the V pieces of channel quality information reported semi-periodically; and/or a reporting priority of the first type of the X pieces of channel quality information reported semi-periodically is higher than or equal to the reporting priority of the first type of the V pieces of channel quality information reported periodically; and/or a reporting priority of the first type of the X pieces of channel quality information reported periodically is higher than or equal to a reporting priority of the first type of the Q pieces of channel quality information reported aperiodically; and/or the reporting priority of the first type of the X pieces of channel quality information reported semi-periodically is higher than or equal to the reporting priority of the first type of the Q pieces of channel quality information reported aperiodically; and/or the reporting priority of the first type of the X pieces of channel quality information reported periodically is higher than or equal to the reporting priority of the first type of the Q pieces of channel quality information reported semi-periodically.

Optionally, in the first aspect and the second aspect, channel quality information on time-frequency resources that are located on two sides of the time-frequency resource on which the DMRS is located and that are at a same distance from the time-frequency resource on which the DMRS is located is the same.

According to a third aspect, a terminal device is provided. The terminal device includes at least one module, and the at least one module is configured to implement the channel quality information transmission method provided in the first aspect or any optional manner of the first aspect.

According to a fourth aspect, a network device is provided. The network device includes at least one module, and the at least one module is configured to implement the channel quality information transmission method provided in the second aspect or any optional manner of the second aspect.

According to a fifth aspect, a processing apparatus is provided. The processing apparatus includes a processor and a memory, the processor is configured to execute an instruction stored in the memory, and the processor executes the instruction to implement the channel quality information transmission method provided in the first aspect or any optional manner of the first aspect.

According to a sixth aspect, a processing apparatus is provided. The processing apparatus includes a processor and a memory, the processor is configured to execute an instruction stored in the memory, and the processor executes the instruction to implement the channel quality information transmission method provided in the second aspect or any optional manner of the second aspect.

According to a seventh aspect, a computer readable storage medium is provided. The computer readable storage medium stores an instruction, and when the instruction runs on a processing component of a computer, the processing component is enabled to perform the channel quality information transmission method provided in the first aspect or any optional manner of the first aspect.

According to an eighth aspect, a computer readable storage medium is provided. The computer readable storage medium stores an instruction, and when the instruction runs on a processing component of a computer, the processing component is enabled to perform the channel quality information transmission method provided in the second aspect or any optional manner of the second aspect.

According to a ninth aspect, a processing apparatus is provided. The processing apparatus includes at least one circuit, and the at least one circuit is configured to perform the channel quality information transmission method provided in the first aspect or any optional manner of the first aspect.

According to a tenth aspect, a processing apparatus is provided. The processing apparatus includes at least one circuit, and the at least one circuit is configured to perform the channel quality information transmission method provided in the second aspect or any optional manner of the second aspect.

According to an eleventh aspect, a computer program product including an instruction is provided. When the computer program product runs on a processing component of a computer, the processing component is enabled to perform the channel quality information transmission method provided in the first aspect or any optional manner of the first aspect.

According to a twelfth aspect, a computer program product including an instruction is provided. When the computer program product runs on a processing component of a computer, the processing component is enabled to perform the channel quality information transmission method provided in the second aspect or any optional manner of the second aspect.

According to a thirteenth aspect, a channel quality information transmission system is provided, and the system includes a terminal device and a network device, where the terminal device includes the terminal device in the third aspect, and the network device includes the network device in the fourth aspect; or the terminal device includes the terminal device in the fifth aspect, and the network device includes the network device in the sixth aspect.

According to a fourteenth aspect, a channel quality information transmission method is provided, including: determining, by a terminal device, a discarding priority of channel quality information according to a discarding priority rule when reporting of first channel quality information conflicts with reporting of second channel quality information, where the channel quality information includes the first channel quality information and the second channel quality information, and the channel quality information indicates channel quality; determining, by the terminal device, to-be-reported content or to-be-discarded content based on the discarding priority of the channel quality information; and reporting, by the terminal device, the to-be-reported content to a network device; where the discarding priority rule includes: when the first channel quality information and the second channel quality information are the same in terms of time domain type and are different in terms of content type, determining the discarding priority of the channel quality information based on a content type of the channel quality information and/or a channel quality level; or when the first channel quality information and the second channel quality information are different in terms of time domain type and are the same or different in terms of content type, determining the discarding priority of the channel quality information based on a time domain type of the channel quality information and/or a channel quality level.

Optionally, before the reporting, by the terminal device, the to-be-reported content to a network device, the method further includes: determining, by the terminal device, a coding scheme and/or a modulation scheme for channel quality information in the to-be-reported content based on a channel quality level indicated by the channel quality information; and coding, by the terminal device, the channel quality information in the to-be-reported content based on the coding scheme; and/or modulating, by the terminal device, the channel quality information in the to-be-reported content based on the modulation scheme; where a coding bit rate of channel quality information indicating high channel quality is less than or equal to a coding bit rate of channel quality information indicating low channel quality; and/or a distance between a time-frequency resource on which the channel quality information indicating high channel quality is located and a time-frequency resource on which a demodulation reference signal DMRS is located is less than or equal to a distance between a time-frequency resource on which the channel quality information indicating low channel quality is located and the time-frequency resource on which the DMRS is located.

According to a fifteenth aspect, a channel quality information transmission method is provided, including: receiving, by a network device, to-be-reported content reported by a terminal device, where the to-be-reported content is reported by the terminal device to the network device after the terminal device determines a discarding priority of channel quality information according to a discarding priority rule when reporting of first channel quality information conflicts with reporting of second channel quality information, and determines the to-be-reported content or to-be-discarded content based on the discarding priority of the channel quality information, the channel quality information includes the first channel quality information and the second channel quality information, and the channel quality information indicates channel quality; and parsing, by the network device, the to-be-reported content; where the discarding priority rule includes: when the first channel quality information and the second channel quality information are the same in terms of time domain type and are different in terms of content type, determining the discarding priority of the channel quality information based on a content type of the channel quality information and/or a channel quality level; or when the first channel quality information and the second channel quality information are different in terms of time domain type and are the same or different in terms of content type, determining the discarding priority of the channel quality information based on a time domain type of the channel quality information and/or a channel quality level.

Optionally, before the parsing, by the network device, the to-be-reported content, the method further includes: determining, by the network device, a coding scheme and/or a modulation scheme for channel quality information in the to-be-reported content; and demodulating, by the network device, the channel quality information in the to-be-reported content based on the modulation scheme; and/or decoding, by the network device, the channel quality information in the to-be-reported content based on the coding scheme; where a coding bit rate of channel quality information indicating high channel quality is less than or equal to a coding bit rate of channel quality information indicating low channel quality; and/or a distance between a time-frequency resource on which the channel quality information indicating high channel quality is located and a time-frequency resource on which a demodulation reference signal DMRS is located is less than or equal to a distance between a time-frequency resource on which the channel quality information indicating low channel quality is located and the time-frequency resource on which the DMRS is located.

According to a sixteenth aspect, a terminal device is provided, including: a first determining module, configured to determine a discarding priority of channel quality information according to a discarding priority rule when reporting of first channel quality information conflicts with reporting of second channel quality information, where the channel quality information includes the first channel quality information and the second channel quality information, and the channel quality information indicates channel quality; a second determining module, configured to determine to-be-reported content or to-be-discarded content based on the discarding priority of the channel quality information; and a reporting module, configured to report the to-be-reported content to a network device; where the discarding priority rule includes: when the first channel quality information and the second channel quality information are the same in terms of time domain type and are different in terms of content type, determining the discarding priority of the channel quality information based on a content type of the channel quality information and/or a channel quality level; or when the first channel quality information and the second channel quality information are different in terms of time domain type and are the same or different in terms of content type, determining the discarding priority of the channel quality information based on a time domain type of the channel quality information and/or a channel quality level.

Optionally, the terminal device further includes: a third determining module, configured to determine a coding scheme and/or a modulation scheme for channel quality information in the to-be-reported content based on a channel quality level indicated by the channel quality information; and a coding module, configured to code the channel quality information in the to-be-reported content based on the coding scheme; and/or a modulation module, configured to modulate the channel quality information in the to-be-reported content based on the modulation scheme; where a coding bit rate of channel quality information indicating high channel quality is less than or equal to a coding bit rate of channel quality information indicating low channel quality; and/or a distance between a time-frequency resource on which the channel quality information indicating high channel quality is located and a time-frequency resource on which a demodulation reference signal DMRS is located is less than or equal to a distance between a time-frequency resource on which the channel quality information indicating low channel quality is located and the time-frequency resource on which the DMRS is located.

According to a seventeenth aspect, a network device is provided, including: a receiving module, configured to receive to-be-reported content reported by a terminal device, where the to-be-reported content is reported by the terminal device to the network device after the terminal device determines a discarding priority of channel quality information according to a discarding priority rule when reporting of first channel quality information conflicts with reporting of second channel quality information, and determines the to-be-reported content or to-be-discarded content based on the discarding priority of the channel quality information, the channel quality information includes the first channel quality information and the second channel quality information, and the channel quality information indicates channel quality; and a parsing module, configured to parse the to-be-reported content; where the discarding priority rule includes: when the first channel quality information and the second channel quality information are the same in terms of time domain type and are different in terms of content type, determining the discarding priority of the channel quality information based on a content type of the channel quality information and/or a channel quality level; or when the first channel quality information and the second channel quality information are different in terms of time domain type and are the same or different in terms of content type, determining the discarding priority of the channel quality information based on a time domain type of the channel quality information and/or a channel quality level.

Optionally, the network device further includes: a determining module, configured to determine a coding scheme and/or a modulation scheme for channel quality information in the to-be-reported content; and a demodulation module, configured to demodulate the channel quality information in the to-be-reported content based on the modulation scheme; and/or a decoding module, configured to decode the channel quality information in the to-be-reported content based on the coding scheme; where a coding bit rate of channel quality information indicating high channel quality is less than or equal to a coding bit rate of channel quality information indicating low channel quality; and/or a distance between a time-frequency resource on which the channel quality information indicating high channel quality is located and a time-frequency resource on which a demodulation reference signal DMRS is located is less than or equal to a distance between a time-frequency resource on which the channel quality information indicating low channel quality is located and the time-frequency resource on which the DMRS is located.

Optionally, in the fourteenth aspect to the seventeenth aspect, a content type of at least one of the first channel quality information or the second channel quality information is a first type.

Optionally, in the fourteenth aspect to the seventeenth aspect, the content type includes a first type and a second type; channel quality information whose content type is the first type includes at least one of an identifier of a reference signal resource or quality information of the reference signal resource, wherein the quality information of the reference signal resource includes at least one of a reference signal received power, reference signal received quality, or a channel quality indicator; and channel quality information whose content type is the second type includes at least one of an identifier of a reference signal resource, a rank indicator, a precoding matrix indicator, or a channel quality indicator.

Optionally, in the fourteenth aspect to the seventeenth aspect, the time domain type includes at least one of periodic reporting, semi-periodic reporting, or aperiodic reporting.

Optionally, in the fourteenth aspect to the seventeenth aspect, the first channel quality information includes N pieces of channel quality information whose content type is the first type, the N pieces of channel quality information include X pieces of channel quality information and Y pieces of channel quality information, and channel quality indicated by any one of the X pieces of channel quality information is higher than or equal to channel quality indicated by any one of the Y pieces of channel quality information, where X+Y≤N, and X, Y, and N all are integers greater than or equal to 1; and the second channel quality information includes M pieces of channel quality information whose content type is the first type, the M pieces of channel quality information include V pieces of channel quality information and Q pieces of channel quality information, and channel quality indicated by any one of the V pieces of channel quality information is higher than or equal to channel quality indicated by any one of the Q pieces of channel quality information, where V+Q≤M, and V, Q, and M all are integers greater than or equal to 1; or the second channel quality information includes K pieces of channel quality information whose content type is the second type, where K is an integer greater than or equal to 1.

Optionally, in the fourteenth aspect to the seventeenth aspect, when the first channel quality information and the second channel quality information are the same in terms of time domain type and are different in terms of content type, a discarding priority of the first type of the X pieces of channel quality information is lower than or equal to a discarding priority of the second type of the second channel quality information, and the discarding priority of the second type of the second channel quality information is lower than or equal to a discarding priority of the first type of the Y pieces of channel quality information; or a discarding priority of the first type of the X pieces of channel quality information is lower than or equal to a discarding priority of the first type of the Y pieces of channel quality information, and the discarding priority of the first type of the Y pieces of channel quality information is lower than or equal to a discarding priority of the second type of the second channel quality information.

Optionally, in the fourteenth aspect to the seventeenth aspect, when the first channel quality information and the second channel quality information are different in terms of time domain type and content type, a discarding priority of the first type of the first channel quality information reported aperiodically is lower than or equal to a discarding priority of the second type of the second channel quality information reported periodically; and/or a discarding priority of the second type of the second channel quality information reported aperiodically is lower than or equal to a discarding priority of the first type of the first channel quality information reported periodically; and/or the discarding priority of the first type of the first channel quality information reported aperiodically is lower than or equal to a discarding priority of the second type of the second channel quality information reported semi-periodically; and/or the discarding priority of the second type of the second channel quality information reported aperiodically is lower than or equal to a discarding priority of the first type of the first channel quality information reported semi-periodically.

Optionally, in the fourteenth aspect to the seventeenth aspect, when the first channel quality information and the second channel quality information are different in terms of time domain type and are the same in terms of content type, a discarding priority of the first type of the first channel quality information reported aperiodically is lower than or equal to a discarding priority of the first type of the first channel quality information reported periodically; and/or the discarding priority of the first type of the first channel quality information reported aperiodically is lower than or equal to a discarding priority of the first type of the first channel quality information reported semi-periodically; and/or the discarding priority of the first type of the first channel quality information reported semi-periodically is lower than or equal to the discarding priority of the first type of the first channel quality information reported periodically; and/or a discarding priority of the first type of the Y pieces of channel quality information reported aperiodically is lower than or equal to a discarding priority of the first type of the Q pieces of channel quality information reported periodically; and/or the discarding priority of the first type of the Y pieces of channel quality information reported aperiodically is lower than or equal to a discarding priority of the first type of the Q pieces of channel quality information reported semi-periodically; and/or a discarding priority of the first type of the Y pieces of channel quality information reported semi-periodically is lower than or equal to the discarding priority of the first type of the Q pieces of channel quality information reported periodically; and/or a discarding priority of the first type of the X pieces of channel quality information reported aperiodically is lower than or equal to a discarding priority of the first type of the V pieces of channel quality information reported periodically; and/or the discarding priority of the first type of the X pieces of channel quality information reported aperiodically is lower than or equal to a discarding priority of the first type of the V pieces of channel quality information reported semi-periodically; and/or a discarding priority of the first type of the X pieces of channel quality information reported semi-periodically is lower than or equal to the discarding priority of the first type of the V pieces of channel quality information reported periodically; and/or a discarding priority of the first type of the X pieces of channel quality information reported periodically is lower than or equal to a discarding priority of the first type of the Q pieces of channel quality information reported aperiodically; and/or the discarding priority of the first type of the X pieces of channel quality information reported semi-periodically is lower than or equal to the discarding priority of the first type of the Q pieces of channel quality information reported aperiodically; and/or the discarding priority of the first type of the X pieces of channel quality information reported periodically is lower than or equal to the discarding priority of the first type of the Q pieces of channel quality information reported semi-periodically.

Optionally, in the fourteenth aspect to the seventeenth aspect, channel quality information on time-frequency resources that are located on two sides of the time-frequency resource on which the DMRS is located and that are at a same distance from the time-frequency resource on which the DMRS is located is the same.

According to an eighteenth aspect, a processing apparatus is provided. The processing apparatus includes a processor and a memory, the processor is configured to execute an instruction stored in the memory, and the processor executes the instruction to implement the channel quality information transmission method provided in the fourteenth aspect or any optional manner of the fourteenth aspect.

According to a nineteenth aspect, a processing apparatus is provided. The processing apparatus includes a processor and a memory, the processor is configured to execute an instruction stored in the memory, and the processor executes the instruction to implement the channel quality information transmission method provided in the fifteenth aspect or any optional manner of the fifteenth aspect.

According to a twentieth aspect, a computer readable storage medium is provided. The computer readable storage medium stores an instruction, and when the instruction runs on a processing component of a computer, the processing component is enabled to perform the channel quality information transmission method provided in the fourteenth aspect or any optional manner of the fourteenth aspect.

According to a twenty-first aspect, a computer readable storage medium is provided. The computer readable storage medium stores an instruction, and when the instruction runs on a processing component of a computer, the processing component is enabled to perform the channel quality information transmission method provided in the fifteenth aspect or any optional manner of the fifteenth aspect.

According to a twenty-second aspect, a processing apparatus is provided. The processing apparatus includes at least one circuit, and the at least one circuit is configured to perform the channel quality information transmission method provided in the fourteenth aspect or any optional manner of the fourteenth aspect.

According to a twenty-third aspect, a processing apparatus is provided. The processing apparatus includes at least one circuit, and the at least one circuit is configured to perform the channel quality information transmission method provided in the fifteenth aspect or any optional manner of the fifteenth aspect.

According to a twenty-fourth aspect, a computer program product including an instruction is provided. When the computer program product runs on a processing component of a computer, the processing component is enabled to perform the channel quality information transmission method provided in the fourteenth aspect or any optional manner of the fourteenth aspect.

According to a twenty-fifth aspect, a computer program product including an instruction is provided. When the computer program product runs on a processing component of a computer, the processing component is enabled to perform the channel quality information transmission method provided in the fifteenth aspect or any optional manner of the fifteenth aspect.

According to a twenty-sixth aspect, a channel quality information transmission method is provided, and the method is used by a terminal device to report first channel quality information to a network device in a first time unit based on a first reference signal sent by the network device, and to report second channel quality information to the network device in a second time unit based on a second reference signal sent by the network device. The method includes: determining, by the terminal device, a reporting priority of channel quality information according to a reporting priority rule when the first time unit is equal to the second time unit and a quantity of time-frequency resources occupied by the first channel quality information and the second channel quality information exceeds a maximum time-frequency resource carrying capacity of a physical uplink control channel, where the channel quality information includes the first channel quality information and the second channel quality information, and the channel quality information indicates channel quality; determining, by the terminal device, to-be-reported content or to-be-discarded content based on the reporting priority of the channel quality information; and reporting, by the terminal device, the to-be-reported content to the network device; where the reporting priority rule includes: when the first channel quality information and the second channel quality information are the same in terms of time domain type and are different in terms of content type, determining the reporting priority of the channel quality information based on a content type of the channel quality information and/or a channel quality level; or when the first channel quality information and the second channel quality information are different in terms of time domain type and are the same or different in terms of content type, determining the reporting priority of the channel quality information based on a time domain type of the channel quality information and/or a channel quality level.

Optionally, before the reporting, by the terminal device, the to-be-reported content to the network device, the method further includes: determining, by the terminal device, a coding scheme and/or a modulation scheme for channel quality information in the to-be-reported content based on a channel quality level indicated by the channel quality information; and coding, by the terminal device, the channel quality information in the to-be-reported content based on the coding scheme; and/or modulating, by the terminal device, the channel quality information in the to-be-reported content based on the modulation scheme; where a coding bit rate of channel quality information indicating high channel quality is less than or equal to a coding bit rate of channel quality information indicating low channel quality; and/or a distance between a time-frequency resource on which the channel quality information indicating high channel quality is located and a time-frequency resource on which a demodulation reference signal DMRS is located is less than or equal to a distance between a time-frequency resource on which the channel quality information indicating low channel quality is located and the time-frequency resource on which the DMRS is located.

According to a twenty-seventh aspect, a channel quality information transmission method is provided, and the method is used by a terminal device to report first channel quality information to a network device in a first time unit based on a first reference signal sent by the network device, and to report second channel quality information to the network device in a second time unit based on a second reference signal sent by the network device. The method includes: receiving, by the network device, to-be-reported content reported by the terminal device, where the to-be-reported content is reported by the terminal device to the network device after the terminal device determines a reporting priority of channel quality information according to a reporting priority rule when the first time unit is equal to the second time unit and a quantity of time-frequency resources occupied by the first channel quality information and the second channel quality information exceeds a maximum time-frequency resource carrying capacity of a physical uplink control channel, and determines the to-be-reported content or to-be-discarded content based on the reporting priority of the channel quality information, the channel quality information includes the first channel quality information and the second channel quality information, and the channel quality information indicates channel quality; and parsing, by the network device, the to-be-reported content; where the reporting priority rule includes: when the first channel quality information and the second channel quality information are the same in terms of time domain type and are different in terms of content type, determining the reporting priority of the channel quality information based on a content type of the channel quality information and/or a channel quality level; or when the first channel quality information and the second channel quality information are different in terms of time domain type and are the same or different in terms of content type, determining the reporting priority of the channel quality information based on a time domain type of the channel quality information and/or a channel quality level.

Optionally, before the parsing, by the network device, the to-be-reported content, the method further includes: determining, by the network device, a coding scheme and/or a modulation scheme for channel quality information in the to-be-reported content; and demodulating, by the network device, the channel quality information in the to-be-reported content based on the modulation scheme; and/or decoding, by the network device, the channel quality information in the to-be-reported content based on the coding scheme; where a coding bit rate of channel quality information indicating high channel quality is less than or equal to a coding bit rate of channel quality information indicating low channel quality; and/or a distance between a time-frequency resource on which the channel quality information indicating high channel quality is located and a time-frequency resource on which a demodulation reference signal DMRS is located is less than or equal to a distance between a time-frequency resource on which the channel quality information indicating low channel quality is located and the time-frequency resource on which the DMRS is located.

According to a twenty-eighth aspect, a terminal device is provided, and the terminal device reports first channel quality information to a network device in a first time unit based on a first reference signal sent by the network device, and reports second channel quality information to the network device in a second time unit based on a second reference signal sent by the network device. The terminal device includes: a first determining module, configured to determine a reporting priority of channel quality information according to a reporting priority rule when the first time unit is equal to the second time unit and a quantity of time-frequency resources occupied by the first channel quality information and the second channel quality information exceeds a maximum time-frequency resource carrying capacity of a physical uplink control channel, where the channel quality information includes the first channel quality information and the second channel quality information, and the channel quality information indicates channel quality; a second determining module, configured to determine to-be-reported content or to-be-discarded content based on the reporting priority of the channel quality information; and a reporting module, configured to report the to-be-reported content to the network device; where the reporting priority rule includes: when the first channel quality information and the second channel quality information are the same in terms of time domain type and are different in terms of content type, determining the reporting priority of the channel quality information based on a content type of the channel quality information and/or a channel quality level; or when the first channel quality information and the second channel quality information are different in terms of time domain type and are the same or different in terms of content type, determining the reporting priority of the channel quality information based on a time domain type of the channel quality information and/or a channel quality level.

Optionally, the terminal device further includes: a third determining module, configured to determine a coding scheme and/or a modulation scheme for channel quality information in the to-be-reported content based on a channel quality level indicated by the channel quality information; and a coding module, configured to code the channel quality information in the to-be-reported content based on the coding scheme; and/or a modulation module, configured to modulate the channel quality information in the to-be-reported content based on the modulation scheme; where a coding bit rate of channel quality information indicating high channel quality is less than or equal to a coding bit rate of channel quality information indicating low channel quality; and/or a distance between a time-frequency resource on which the channel quality information indicating high channel quality is located and a time-frequency resource on which a demodulation reference signal DMRS is located is less than or equal to a distance between a time-frequency resource on which the channel quality information indicating low channel quality is located and the time-frequency resource on which the DMRS is located.

According to a twenty-ninth aspect, a network device is provided, and a terminal device reports first channel quality information to the network device in a first time unit based on a first reference signal sent by the network device, and reports second channel quality information to the network device in a second time unit based on a second reference signal sent by the network device. The network device includes: a receiving module, configured to receive to-be-reported content reported by the terminal device, where the to-be-reported content is reported by the terminal device to the network device after the terminal device determines a reporting priority of channel quality information according to a reporting priority rule when the first time unit is equal to the second time unit and a quantity of time-frequency resources occupied by the first channel quality information and the second channel quality information exceeds a maximum time-frequency resource carrying capacity of a physical uplink control channel, and determines the to-be-reported content or to-be-discarded content based on the reporting priority of the channel quality information, the channel quality information includes the first channel quality information and the second channel quality information, and the channel quality information indicates channel quality; and a parsing module, configured to parse the to-be-reported content; where the reporting priority rule includes: when the first channel quality information and the second channel quality information are the same in terms of time domain type and are different in terms of content type, determining the reporting priority of the channel quality information based on a content type of the channel quality information and/or a channel quality level; or when the first channel quality information and the second channel quality information are different in terms of time domain type and are the same or different in terms of content type, determining the reporting priority of the channel quality information based on a time domain type of the channel quality information and/or a channel quality level.

Optionally, the network device further includes: a determining module, configured to determine a coding scheme and/or a modulation scheme for channel quality information in the to-be-reported content; and a demodulation module, configured to demodulate the channel quality information in the to-be-reported content based on the modulation scheme; and/or a decoding module, configured to decode the channel quality information in the to-be-reported content based on the coding scheme; where a coding bit rate of channel quality information indicating high channel quality is less than or equal to a coding bit rate of channel quality information indicating low channel quality; and/or a distance between a time-frequency resource on which the channel quality information indicating high channel quality is located and a time-frequency resource on which a demodulation reference signal DMRS is located is less than or equal to a distance between a time-frequency resource on which the channel quality information indicating low channel quality is located and the time-frequency resource on which the DMRS is located.

Optionally, in the twenty-sixth aspect to the twenty-ninth aspect, a content type of at least one of the first channel quality information or the second channel quality information is a first type.

Optionally, in the twenty-sixth aspect to the twenty-ninth aspect, the content type includes a first type and a second type; channel quality information whose content type is the first type includes at least one of an identifier of a reference signal resource or quality information of the reference signal resource, wherein the quality information of the reference signal resource includes at least one of a reference signal received power, reference signal received quality, or a channel quality indicator; and channel quality information whose content type is the second type includes at least one of an identifier of a reference signal resource, a rank indicator, a precoding matrix indicator, or a channel quality indicator.

Optionally, in the twenty-sixth aspect to the twenty-ninth aspect, the time domain type includes at least one of periodic reporting, semi-periodic reporting, or aperiodic reporting.

Optionally, in the twenty-fifth aspect to the twenty-eighth aspect, the first channel quality information includes N pieces of channel quality information whose content type is the first type, the N pieces of channel quality information include X pieces of channel quality information and Y pieces of channel quality information, and channel quality indicated by any one of the X pieces of channel quality information is higher than or equal to channel quality indicated by any one of the Y pieces of channel quality information, where $X+Y \leq N$, and X, Y, and N all are integers greater than or equal to 1; and the second channel quality information includes M pieces of channel quality information whose content type is the first type, the M pieces of channel quality information include V pieces of channel quality information and Q pieces of channel quality information, and channel quality indicated by any one of the V pieces of channel quality information is higher than or equal to channel quality indicated by any one of the Q pieces of channel quality information, where $V+Q \leq M$, and V, Q, and M all are integers greater than or equal to 1; or the second channel quality information includes K pieces of channel quality information whose content type is the second type, where K is an integer greater than or equal to 1.

Optionally, in the twenty-sixth aspect to the twenty-ninth aspect, when the first channel quality information and the second channel quality information are the same in terms of time domain type and are different in terms of content type, a reporting priority of the first type of the X pieces of channel quality information is higher than or equal to a reporting priority of the second type of the second channel quality information, and the reporting priority of the second type of the second channel quality information is higher than or equal to a reporting priority of the first type of the Y pieces of channel quality information; or a reporting priority of the first type of the X pieces of channel quality information is higher than or equal to a reporting priority of the first type of the Y pieces of channel quality information, and the reporting priority of the first type of the Y pieces of channel quality information is higher than or equal to a reporting priority of the second type of the second channel quality information.

Optionally, in the twenty-sixth aspect to the twenty-ninth aspect, when the first channel quality information and the second channel quality information are different in terms of time domain type and content type, a reporting priority of the first type of the first channel quality information reported aperiodically is higher than or equal to a reporting priority of the second type of the second channel quality information reported periodically; and/or a reporting priority of the second type of the second channel quality information reported aperiodically is higher than or equal to a reporting priority of the first type of the first channel quality information reported periodically; and/or the reporting priority of the first type of the first channel quality information reported aperiodically is higher than or equal to a reporting priority of the second type of the second channel quality information reported semi-periodically; and/or the reporting priority of the second type of the second channel quality information reported aperiodically is higher than or equal to a reporting priority of the first type of the first channel quality information reported semi-periodically.

Optionally, in the twenty-sixth aspect to the twenty-ninth aspect, when the first channel quality information and the second channel quality information are different in terms of time domain type and are the same in terms of content type, a reporting priority of the first type of the first channel quality information reported aperiodically is higher than or equal to a reporting priority of the first type of the first channel quality information reported periodically; and/or the reporting priority of the first type of the first channel quality information reported aperiodically is higher than or equal to a reporting priority of the first type of the first channel quality information reported semi-periodically; and/or the reporting priority of the first type of the first channel quality information reported semi-periodically is higher than or equal to the reporting priority of the first type of the first channel quality information reported periodically; and/or a reporting priority of the first type of the Y pieces of channel quality information reported aperiodically is higher than or equal to a reporting priority of the first type of the Q pieces of channel quality information reported periodically; and/or the reporting priority of the first type of the Y pieces of channel quality information reported aperiodically is higher than or equal to a reporting priority of the first type of the Q pieces of channel quality information reported semi-periodically; and/or a reporting priority of the first type of the Y pieces of channel quality information reported semi-periodically is higher than or equal to the reporting priority of the first type of the Q pieces of channel quality information reported periodically; and/or a reporting priority of the first type of the X pieces of channel quality information reported aperiodically is higher than or equal to a reporting priority of the first type of the V pieces of channel quality information reported periodically; and/or the reporting priority of the first type of the X pieces of channel quality information reported aperiodically is higher than or equal to a reporting priority of the first type of the V pieces of channel quality information reported semi-periodically; and/or a reporting priority of the first type of the X pieces of channel quality information reported semi-periodically is higher than or equal to the reporting priority of the first type of the V pieces of channel quality information reported periodically; and/or a reporting priority of the first type of the X pieces of channel quality information reported periodically is higher than or equal to a reporting priority of the first type of the Q pieces of channel quality information reported aperiodically; and/or the reporting priority of the first type of the X pieces of channel quality information reported semi-periodically is higher than or equal to the reporting priority of the first type of the Q pieces of channel quality information reported aperiodically; and/or the reporting priority of the first type of the X pieces of channel quality information reported periodically is higher than or equal to the reporting priority of the first type of the Q pieces of channel quality information reported semi-periodically.

Optionally, in the twenty-sixth aspect to the twenty-ninth aspect, channel quality information on time-frequency resources that are located on two sides of the time-frequency resource on which the DMRS is located and that are at a same distance from the time-frequency resource on which the DMRS is located is the same.

According to a thirtieth aspect, a processing apparatus is provided. The processing apparatus includes a processor and a memory, the processor is configured to execute an instruction stored in the memory, and the processor executes the instruction to implement the channel quality information transmission method provided in the twenty-sixth aspect or any optional manner of the twenty-sixth aspect.

According to a thirty-first aspect, a processing apparatus is provided. The processing apparatus includes a processor and a memory, the processor is configured to execute an instruction stored in the memory, and the processor executes the instruction to implement the channel quality information transmission method provided in the twenty-seventh aspect or any optional manner of the twenty-seventh aspect.

According to a thirty-second aspect, a computer readable storage medium is provided. The computer readable storage medium stores an instruction, and when the instruction runs on a processing component of a computer, the processing component is enabled to perform the channel quality information transmission method provided in the twenty-sixth aspect or any optional manner of the twenty-sixth aspect.

According to a thirty-third aspect, a computer readable storage medium is provided. The computer readable storage medium stores an instruction, and when the instruction runs on a processing component of a computer, the processing component is enabled to perform the channel quality information transmission method provided in the twenty-seventh aspect or any optional manner of the twenty-seventh aspect.

According to a thirty-fourth aspect, a processing apparatus is provided. The processing apparatus includes at least one circuit, and the at least one circuit is configured to perform the channel quality information transmission method provided in the twenty-sixth aspect or any optional manner of the twenty-sixth aspect.

According to a thirty-fifth aspect, a processing apparatus is provided. The processing apparatus includes at least one circuit, and the at least one circuit is configured to perform the channel quality information transmission method provided in the twenty-seventh aspect or any optional manner of the twenty-seventh aspect.

According to a thirty-sixth aspect, a computer program product including an instruction is provided. When the computer program product runs on a processing component of a computer, the processing component is enabled to perform the channel quality information transmission method provided in the twenty-sixth aspect or any optional manner of the twenty-sixth aspect.

According to a thirty-seventh aspect, a computer program product including an instruction is provided. When the computer program product runs on a processing component of a computer, the processing component is enabled to perform the channel quality information transmission method provided in the twenty-seventh aspect or any optional manner of the twenty-seventh aspect.

According to a thirty-eighth aspect, a channel quality information transmission method is provided, including: determining, by a terminal device, a coding scheme and/or a modulation scheme for channel quality information based on a channel quality level indicated by the channel quality information; coding, by the terminal device, the channel quality information based on the coding scheme; and/or modulating, by the terminal device, the channel quality information based on the modulation scheme; and reporting, by the terminal device, the coded and/or modulated channel quality information to a network device.

Optionally, a coding bit rate of channel quality information indicating high channel quality is less than or equal to a coding bit rate of channel quality information indicating low channel quality; and/or a distance between a time-frequency resource on which the channel quality information indicating high channel quality is located and a time-frequency resource on which a demodulation reference signal DMRS is located is less than or equal to a distance between a time-frequency resource on which the channel quality information indicating low channel quality is located and the time-frequency resource on which the DMRS is located.

Optionally, channel quality information on time-frequency resources that are located on two sides of the time-frequency resource on which the DMRS is located and that are at a same distance from the time-frequency resource on which the DMRS is located is the same.

According to a thirty-ninth aspect, a channel quality information transmission method is provided, including: receiving, by a network device, channel quality information sent by a terminal device; determining, by the network device, a coding scheme and/or a modulation scheme for the channel quality information; and demodulating, by the network device, the channel quality information based on the modulation scheme; and/or decoding, by the network device, the channel quality information based on the coding scheme.

Optionally, a coding bit rate of channel quality information indicating high channel quality is less than or equal to a coding bit rate of channel quality information indicating low channel quality; and/or a distance between a time-frequency resource on which the channel quality information indicating high channel quality is located and a time-frequency resource on which a demodulation reference signal DMRS is located is less than or equal to a distance between a time-frequency resource on which the channel quality information indicating low channel quality is located and the time-frequency resource on which the DMRS is located.

Optionally, channel quality information on time-frequency resources that are located on two sides of the time-frequency resource on which the DMRS is located and that are at a same distance from the time-frequency resource on which the DMRS is located is the same.

According to a fortieth aspect, a terminal device is provided, including: a determining module, configured to determine a coding scheme and/or a modulation scheme for channel quality information based on a channel quality level indicated by the channel quality information; a coding module, configured to code the channel quality information based on the coding scheme; and/or a modulation module, configured to modulate the channel quality information based on the modulation scheme; and a reporting module, configured to report the coded and/or modulated channel quality information to a network device.

Optionally, a coding bit rate of channel quality information indicating high channel quality is less than or equal to a coding bit rate of channel quality information indicating low channel quality; and/or a distance between a time-frequency resource on which the channel quality information indicating high channel quality is located and a time-frequency resource on which a demodulation reference signal DMRS is located is less than or equal to a distance between a time-frequency resource on which the channel quality information indicating low channel quality is located and the time-frequency resource on which the DMRS is located.

Optionally, channel quality information on time-frequency resources that are located on two sides of the time-frequency resource on which the DMRS is located and that are at a same distance from the time-frequency resource on which the DMRS is located is the same.

According to a forty-first aspect, a network device is provided, including: a receiving module, configured to receive channel quality information sent by a terminal device; a determining module, configured to determine a coding scheme and/or a modulation scheme for the channel quality information; and a demodulation module, configured to demodulate the channel quality information based on the modulation scheme; and/or a decoding module, configured to decode the channel quality information based on the coding scheme.

Optionally, a coding bit rate of channel quality information indicating high channel quality is less than or equal to a coding bit rate of channel quality information indicating low channel quality; and/or a distance between a time-frequency resource on which the channel quality information indicating high channel quality is located and a time-frequency resource on which a demodulation reference signal DMRS is located is less than or equal to a distance between a time-frequency resource on which the channel quality information indicating low channel quality is located and the time-frequency resource on which the DMRS is located.

Optionally, channel quality information on time-frequency resources that are located on two sides of the time-frequency resource on which the DMRS is located and that are at a same distance from the time-frequency resource on which the DMRS is located is the same.

According to a forty-second aspect, a processing apparatus is provided. The processing apparatus includes a processor and a memory, the processor is configured to execute an instruction stored in the memory, and the processor executes the instruction to implement the channel quality information transmission method provided in the thirty-eighth or any optional manner of the thirty-eighth aspect.

According to a forty-third aspect, a processing apparatus is provided. The processing apparatus includes a processor and a memory, the processor is configured to execute an instruction stored in the memory, and the processor executes the instruction to implement the channel quality information transmission method provided in the thirty-ninth or any optional manner of the thirty-ninth aspect.

According to a forty-fourth aspect, a computer readable storage medium is provided. The computer readable storage medium stores an instruction, and when the instruction runs on a processing component of a computer, the processing component is enabled to perform the channel quality information transmission method provided in the thirty-eighth aspect or any optional manner of the thirty-eighth aspect.

According to a forty-fifth aspect, a computer readable storage medium is provided. The computer readable storage medium stores an instruction, and when the instruction runs on a processing component of a computer, the processing component is enabled to perform the channel quality information transmission method provided in the thirty-ninth aspect or any optional manner of the thirty-ninth aspect.

According to a forty-sixth aspect, a processing apparatus is provided. The processing apparatus includes at least one circuit, and the at least one circuit is configured to perform the channel quality information transmission method provided in the thirty-eighth aspect or any optional manner of the thirty-eighth aspect.

According to a forty-seventh aspect, a processing apparatus is provided. The processing apparatus includes at least one circuit, and the at least one circuit is configured to perform the channel quality information transmission method provided in the thirty-ninth aspect or any optional manner of the thirty-ninth aspect.

According to a forty-eighth aspect, a computer program product including an instruction is provided. When the computer program product runs on a processing component of a computer, the processing component is enabled to perform the channel quality information transmission method provided in the thirty-eighth aspect or any optional manner of the thirty-eighth aspect.

According to a forty-ninth aspect, a computer program product including an instruction is provided. When the computer program product runs on a processing component of a computer, the processing component is enabled to perform the channel quality information transmission method provided in the thirty-ninth aspect or any optional manner of the thirty-ninth aspect.

According to a fiftieth aspect, a channel quality information transmission method is provided, including: generating a channel measurement report corresponding to a current reporting occasion, where the current reporting occasion is a common reporting occasion of at least two measurement reports, and in the channel measurement report, current report content of at least one measurement report is different from default report content of the measurement report; and sending the channel measurement report.

According to a fifty-first aspect, a terminal device is provided, including: a generation module, configured to generate a channel measurement report corresponding to a current reporting occasion, where the current reporting occasion is a common reporting occasion of at least two measurement reports, and in the channel measurement report, current report content of at least one measurement report is different from default report content of the measurement report; and a sending module, configured to send the channel measurement report.

Optionally, in the fiftieth aspect and the fifty-first aspect, the at least two measurement reports include a first measurement report and a second measurement report. The default report content includes at least one of an identifier of a reference signal resource, a rank indicator, a precoding matrix indicator, or a channel quality indicator. When a quantity of resources occupied by report content of the channel measurement report is greater than a total quantity of resources, the current report content includes at least one of the identifier of the reference signal resource or quality information of the reference signal resource, and the current report content includes at least one of the identifier of the reference signal resource, the rank indicator, the precoding matrix indicator, or the channel quality indicator. The quality information of the reference signal resource includes at least one of a reference signal received power, reference signal received quality, or the channel quality indicator. The current report content is different from the default report content.

Optionally, in the fiftieth aspect and the fifty-first aspect, both the first measurement report and the second measurement report have a time domain type, and the time domain type includes at least one of periodic reporting, semi-periodic reporting, or aperiodic reporting.

Optionally, in the fiftieth aspect and the fifty-first aspect, report content of the first measurement report is different from report content of the second measurement report; and when a time domain type of the first measurement report is aperiodic reporting, and a time domain type of the second measurement report is periodic reporting, a reporting priority of the first measurement report is higher than or equal to a reporting priority of the second measurement report; and/or when the time domain type of the first measurement report is periodic reporting, and the time domain type of the second measurement report is aperiodic reporting, the reporting priority of the second measurement report is higher than or equal to the reporting priority of the first measurement report; and/or when the time domain type of the first measurement report is aperiodic reporting, and the time domain type of the second measurement report is semi-periodic reporting, the reporting priority of the first measurement report is higher than or equal to the reporting priority of the second measurement report; and/or when the time domain type of the first measurement report is semi-periodic reporting, and the time domain type of the second measurement report is aperiodic reporting, the reporting priority of the second measurement report is higher than or equal to the reporting priority of the first measurement report.

Optionally, in the fiftieth aspect and the fifty-first aspect, report content of the first measurement report is the same as report content of the second measurement report; and when a time domain type of the first measurement report is aperiodic reporting, and a time domain type of the second measurement report is periodic reporting, a reporting priority of the first measurement report is higher than or equal to a reporting priority of the second measurement report; and/or when the time domain type of the first measurement report is aperiodic reporting, and the time domain type of the second measurement report is semi-periodic reporting, the reporting priority of the first measurement report is higher than or equal to the reporting priority of the second measurement report; and/or when the time domain type of the first measurement report is semi-periodic reporting, and the time domain type of the second measurement report is periodic reporting, the reporting priority of the first measurement report is higher than or equal to the reporting priority of the second measurement report.

According to a fifty-second aspect, a chip is provided. The chip includes a programmable logic circuit and/or a program instruction, and when the chip runs, the chip is configured to implement the channel quality information transmission method provided in the first aspect or any optional manner of the first aspect.

According to a fifty-third aspect, a chip is provided. The chip includes a programmable logic circuit and/or a program instruction, and when the chip runs, the chip is configured to implement the channel quality information transmission method provided in the second aspect or any optional manner of the second aspect.

According to a fifty-fourth aspect, a terminal device is provided, including a processor, a transmitter, and a receiver, where the transmitter and the receiver are used by the terminal device to communicate with a network device; and the processor is configured to execute an instruction to implement the channel quality information transmission method in the first aspect or any optional manner of the first aspect.

According to a fifty-fifth aspect, a network device is provided, including a processor, a transmitter, and a receiver, where the transmitter and the receiver are used by the network device to communicate with a terminal device; and the processor is configured to execute an instruction to implement the channel quality information transmission method in the second aspect or any optional manner of the second aspect.

According to a fifty-sixth aspect, a channel quality information transmission system is provided. The channel quality information transmission system includes a terminal device and a network device, the terminal device includes the terminal device in the fifty-fourth aspect, and the network device includes the network device in the fifty-fifth aspect.

According to a fifty-seventh aspect, a processing apparatus is provided. The apparatus is configured to implement the method in the first aspect or any optional manner of the first aspect, or the method in the second aspect or any optional manner of the second aspect.

The technical solutions provided in this application have the following beneficial effects:

According to the channel quality information transmission method and system, the apparatus, and the storage medium provided in this application, the reporting priority of the channel quality information is determined according to the reporting priority rule when reporting of the first channel quality information conflicts with reporting of the second channel quality information; the to-be-reported content or the to-be-discarded content is determined based on the reporting priority of the channel quality information; and the to-be-reported content is reported to the network device. The reporting priority rule includes: when the first channel quality information and the second channel quality information are the same in terms of time domain type and are different in terms of content type, determining the reporting priority of the channel quality information based on the content type of the channel quality information and/or the channel quality level; or when the first channel quality information and the second channel quality information are different in terms of time domain type and are the same or different in terms of content type, determining the reporting priority of the channel quality information based on the time domain type of the channel quality information and/or the channel quality level. The terminal device can determine the reporting priority according to the reporting priority rule when reporting of the first channel quality information conflicts with reporting of the second channel quality information, and determine the to-be-reported content or the to-be-discarded content based on the reporting priority. This can resolve a problem of relatively low reliability of reporting channel quality information, and improve the reliability of reporting the channel quality information.

DESCRIPTION OF EMBODIMENTS

Figure 1:
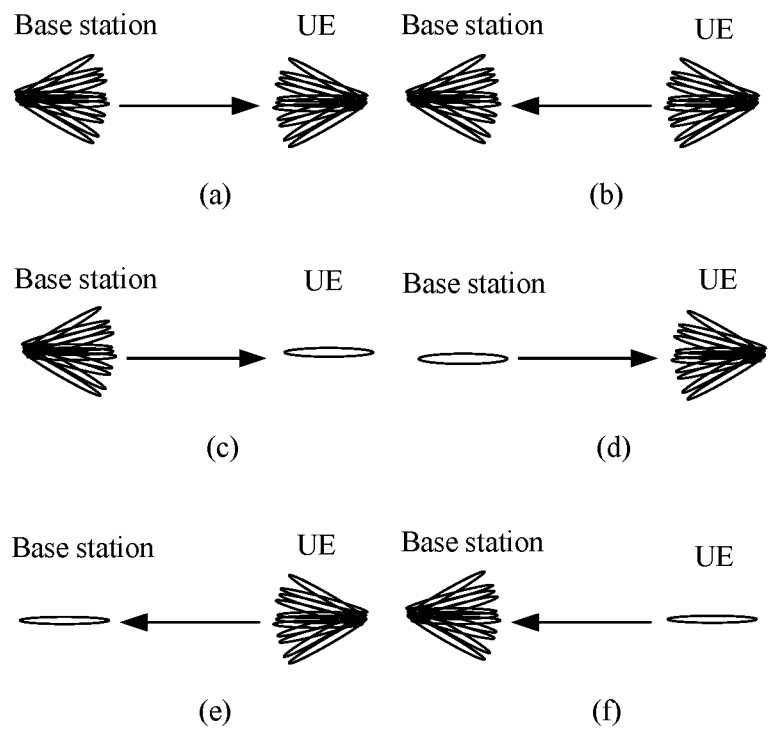
FIG. 1 is a schematic diagram of beam training according to an embodiment of this application.

To make the objectives, technical solutions, and advantages of this application clearer, the following further describes the implementations of this application in detail with reference to the accompanying drawings.

Before the embodiments of this application are described in detail, BSI and CSI in this application are described first. In the embodiments of this application, the BSI and the CSI are used to describe and distinguish different types of channel state information. In an actual standard, the BSI may also be represented by using another noun, or the BSI may also be referred to as the CSI. In the standard, the BSI in the embodiments of this application may also be referred to as an L1-RSRP report (layer 1-reference signal received power report), and the CSI may also be referred to as a CSI report (channel state report). This is not limited in the embodiments of this application.

A communications system usually includes a terminal device and a network device, and different types of reference signals may be transmitted between the terminal device and the network device. The terminal device is usually user equipment (UE), and the network device is usually a base station.

Currently, in terms of function, reference signals are mainly classified into two types: a first-type reference signal and a second-type reference signal. The first-type reference signal is used by the terminal device (or the network device) to perform channel estimation, so that the terminal device (or the network device) can perform coherent demodulation on a received signal including control information or data. The second-type reference signal is used by the terminal device (or the network device) to perform channel state measurement or channel quality measurement, so that the network device implements scheduling on the terminal device. The second-type reference signal may be a channel state information-reference signal (CSI-RS). The terminal device performs channel quality measurement based on the CSI-RS to obtain channel state information (CSI), and the CSI may include at least one of a rank indicator (RI), a precoding matrix indicator (PMI), or a channel quality indicator (CQI). The terminal device may report the CSI to the network device by using a physical uplink control channel (PUCCH) or a physical uplink shared channel (PUSCH).

With emergence of intelligent terminals, especially video services, it is difficult for current spectrum resources to meet an explosively-increasing requirement of a user for a capacity. A high frequency band with wider available bandwidth, especially a millimeter-wave band, gradually becomes a candidate frequency band of a next generation communications system. In the modern communications system, a multiple-antenna technology is usually used to increase a capacity and coverage of the system and improve user experience. Using the high frequency band can greatly reduce a size in a multiple-antenna configuration, so as to facilitate site obtaining and deployment of more antennas. However, different from an operating band in a Long Term Evolution (LTE) system or the like, the high frequency band results in a larger path loss. Particularly, factors such as atmosphere and vegetation in a transmission path further increase the path loss. To reduce the relatively large path loss, a common signal transmission mechanism based on a beamforming technology is used, and the technology may be used to compensate for a path loss in a common signal propagation process by using a relatively large antenna gain. A common signal may include a broadcast signal, a synchronization signal, a cell-specific reference signal, and the like, and beamforming may include any one of beamforming in analog domain, beamforming in baseband domain, and hybrid beamforming.

A beam management mechanism of common signal transmission based on the beamforming technology mainly includes the following three processes. In the following three processes, a transceiver beam (including a transmit beam and a receive beam) of the network device (e.g., a base station) and/or the terminal device (e.g., UE) may be tracked and updated. FIG. 1 is a schematic diagram of beam training according to an embodiment of this application, and FIG. 1 is described by using an example in which the network device is a base station and the terminal device is UE. The following three processes are described below with reference to FIG. 1:

(1) Selection of N optimal beam pair links (BPL) (one BPL includes one transmit beam of the network device and one receive beam of the terminal device, or one BPL includes one transmit beam of the terminal device and one receive beam of the network device). As shown in (a) and (b) in FIG. 1, the terminal device implements selection of the transmit beam of the network device and/or the receive beam of the terminal device based on beam scanning by the network device, and the network device implements selection of the transmit beam of the terminal device and/or the receive beam of the network device based on beam scanning by the terminal device.

(2) An update of a transmit beam, where the transmit beam may be the transmit beam of the network device or the transmit beam of the terminal device. As shown in (c) in FIG. 1, when the transmit beam is the transmit beam of the network device, the base station sends a reference signal to the UE by using different transmit beams, and the UE receives, by using a same receive beam, the reference signal sent by the base station by using the different transmit beams, determines an optimal transmit beam of the base station based on the received signal, and then feeds back the optimal transmit beam of the base station to the base station, so that the base station can update the transmit beam. As shown in (e) in FIG. 1, when the transmit beam is the transmit beam of the terminal device, the UE sends a reference signal to the base station by using different transmit beams, and the base station receives, by using a same receive beam, the reference signal sent by the UE by using the different transmit beams, determines an optimal transmit beam of the UE based on the received signal, and then feeds back the optimal transmit beam of the UE to the UE, so that the UE can update the transmit beam. The process of sending the reference signal by using the different transmit beams may be referred to as beam scanning, and the process of determining the optimal transmit beam based on the received signal may be referred to as beam matching.

(3) An update of a receive beam, where the receive beam may be the receive beam of the network device or the receive beam of the terminal device. As shown in (0 in FIG. 1, when the receive beam is the receive beam of the network device, the UE sends a reference signal to the base station by using a same transmit beam, and the base station receives, by using different receive beams, the reference signal sent by the UE, and then determines an optimal receive beam of the base station based on the received signal, to update the receive beam of the base station. As shown in (d) in FIG. 1, when the receive beam is the receive beam of the UE, the base station sends a reference signal to the UE by using a same transmit beam, and the UE receives, by using different receive beams, the reference signal sent by the base station, and then determines an optimal receive beam of the UE based on the received signal, to update the receive beam of the UE.

During downlink signal transmission, both the transmit beam of the network device and the receive beam of the terminal device may dynamically change. The terminal device may determine a plurality of optimal receive beams based on the received signal. To enable the terminal device to determine the receive beam of the terminal device, the terminal device may feed back information about a plurality of receive beams to the network device, and the network device may indicate the receive beam of the terminal device to the terminal device by sending beam indication information to the terminal device. When the terminal device uses beamforming in analog domain, the terminal device may accurately determine the receive beam of the terminal device based on the beam indication information sent by the network device, thereby reducing a beam scanning time of the terminal device and saving power.

When signal transmission is performed based on the beamforming technology, if the terminal device moves, a direction of a receive beam corresponding to a transmitted signal may not match a location of the moved terminal device, causing frequent signal reception interruption. Beam tracking can alleviate the frequent signal reception interruption to some extent. Beam tracking may be performed by using channel quality measurement based on the beamforming technology and reporting of a channel quality measurement result. Optionally, channel quality measurement may be performed based on a synchronization signal or a cell-specific reference signal. In comparison with a cell handover, the terminal device is handed over between different beams more dynamically and frequently. Therefore, the terminal device may report the channel quality measurement result to the network device by using a dynamic measurement reporting mechanism. Optionally, the terminal device may report the channel quality measurement result to the network device by using a PUCCH or a PUSCH.

In a beam training process, the network device may send a reference signal to the terminal device by using a plurality of transmit beams, and the terminal device may measure the plurality of transmit beams based on the received signal, and select N better transmit beams from the plurality of transmit beams, and report beam measurement information of the N transmit beams to the network device. The beam measurement information is also referred to as beam state information (BSI), the BSI is used for beam management, and the BSI may include at least one of a beam index, a beam reference signal received power (RSRP), or beam reference signal received quality. Through beam training, the network device may determine N BPLs that are used to communicate with the terminal device, and the network device may perform data transmission with the terminal device by using the N BPLs. The N BPLs may include, for example, <Bx, B'x> and <By, B'y>, Bx represents the transmit beam of the network device, B'x represents the receive beam of the terminal device, By represents the transmit beam of the terminal device, and B'y represents the receive beam of the network device. In the embodiments of this application, to reduce reporting overheads, when N is greater than or equal to 2, the terminal device may report the beam measurement information of the N transmit beams to the network device in a differential reporting manner. For example, when BSI includes an RSRP, the terminal device may report a referential RSRP and a differential RSRP to the network device. The referential RSRP is a referential RSRP obtained when differential reporting is performed on the RSRP, and the differential RSRP is a difference between the beam RSRP and the referential RSRP. In a reporting process, there may be one or more referential RSRPs. The referential RSRP may be a highest RSRP in N RSRPs, or may be a lowest RSRP in N RSRPs, or may be an average value of N RSRPs. Selection of the referential RSRP is not limited in the embodiments of this application.

It can be learned from the foregoing description that the terminal device needs to report CSI and BSI of N beams to the network device. Currently, the terminal device may configure the CSI and the BSI on different time-frequency resources of a PUCCH, and use different reporting rules to report the BSI and the CSI to the network device. This may cause a collision between the BSI and the CSI. For example, when the CSI and the BSI are simultaneously transmitted on a short PUCCH, a total quantity of bits of the CSI and the BSI may exceed a maximum carrying capacity of the short PUCCH. For example, when the BSI occupies four resource blocks (Resource Block, RB), the CSI occupies six RBs, and a maximum quantity of RBs of the short PUCCH is 8, the total quantity of RBs occupied by the BSI and the CSI exceeds an upper limit of the short PUCCH. In this case, the BSI collides with the CSI.

Figure 2:
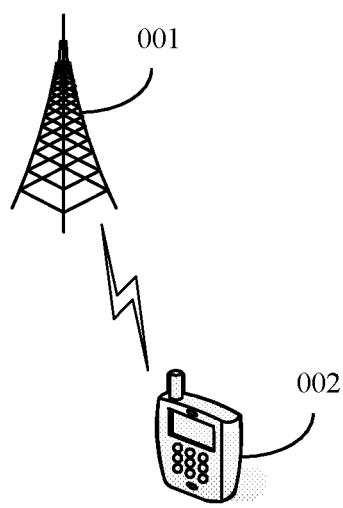
FIG. 2 is a schematic diagram of an implementation environment according to an embodiment of this application.

Referring to FIG. 2, FIG. 2 is a schematic diagram of an implementation environment related to each embodiment of this application. The implementation environment provides a channel quality information reporting system, and the channel quality information reporting system may be a wireless communications system. Referring to FIG. 2, the implementation environment may include a network device 001 and a terminal device 002.

The network device 001 may be a transmitting and receiving point (TRP) device, for example, but is not limited to a base transceiver station (BTS) in a Global System for Mobile Communications (GSM), an NB (NodeB) in a Wideband Code Division Multiple Access (WCDMA) system, an evolved NodeB (eNB) in LTE, a relay station, an in-vehicle device, a wearable device, an access network device in a future 5G communications system, or an access network device in a further evolved public land mobile network (PLMN).

The terminal device 002 may be UE. In addition, the terminal device 002 may also be a mobile console, an access terminal, a subscriber unit, a subscriber station, a mobile station, a remote station, a remote terminal, a mobile device, a user terminal, a terminal, a wireless communications device, a user agent, a user apparatus, or the like. The terminal device 002 may be a cellular phone, a cordless telephone set, a Session Initiation Protocol (SIP) phone, a wireless local loop (WLL) station, a personal digital assistant (PDA), a handheld device having a wireless communication function, a computing device or another processing device connected to a wireless modem, an in-vehicle device, a wearable device, a mobile console in a future 5G network, a terminal device in a further evolved PLMN network, or the like. In addition, the terminal device 002 may further include another device that can perform data communication with the network device such as a relay.

In this implementation environment and the following embodiments, the network device 001 and the terminal device 002 establish a communication connection and may communicate with each other by using the communication connection. In a wireless communications system, the communication connection is usually a wireless connection. When the network device 001 communicates with the terminal device 002, the network device 001 may send a first reference signal to the terminal device 002. The terminal device 002 may determine first channel quality information based on the first reference signal, and report the first channel quality information to the network device 001 in a first time unit. The network device 001 may further send a second reference signal to the terminal device 002. The terminal device 002 may determine second channel quality information based on the second reference signal, and report the second channel quality information to the network device 001 in a second time unit. When a reporting time of the first channel quality information conflicts with a reporting time of the second channel quality information (to be specific, the first time unit is equal to the second time unit), and a quantity of time-frequency resources occupied by the first channel quality information and the second channel quality information exceeds a maximum time-frequency resource carrying capacity of a PUCCH, the terminal device 002 may determine content to be reported to the network device 001 or determine to-be-discarded content based on a priority of channel quality information, and further report the determined to-be-reported content to the network device 001, or report a part of information that is not discarded and that is in the first channel quality information and the second channel quality information to the network device 001. The first reference signal and the second reference signal may be a same reference signal. The network device 001 may simultaneously send the first reference signal and the second reference signal to the terminal device 002, or may first send the first reference signal to the terminal device 002 and then send the second reference signal to the terminal device 002, or may first send the second reference signal to the terminal device 002 and then send the first reference signal to the terminal device 002. Both the first channel quality information and the second channel quality information may be a first type of channel quality information, or the first channel quality information is a first type of channel quality information, and the second channel quality information is a second type of channel quality information. The first type of channel quality information may include at least one of an identifier of a reference signal resource or quality information of the reference signal resource. The quality information of the reference signal resource includes at least one of a reference signal received power, reference signal received quality, or a channel quality indicator. The second type of channel quality information may include at least one of an identifier of a reference signal resource, a rank indicator, a precoding matrix indicator, or a channel quality indicator.

Figure 3:
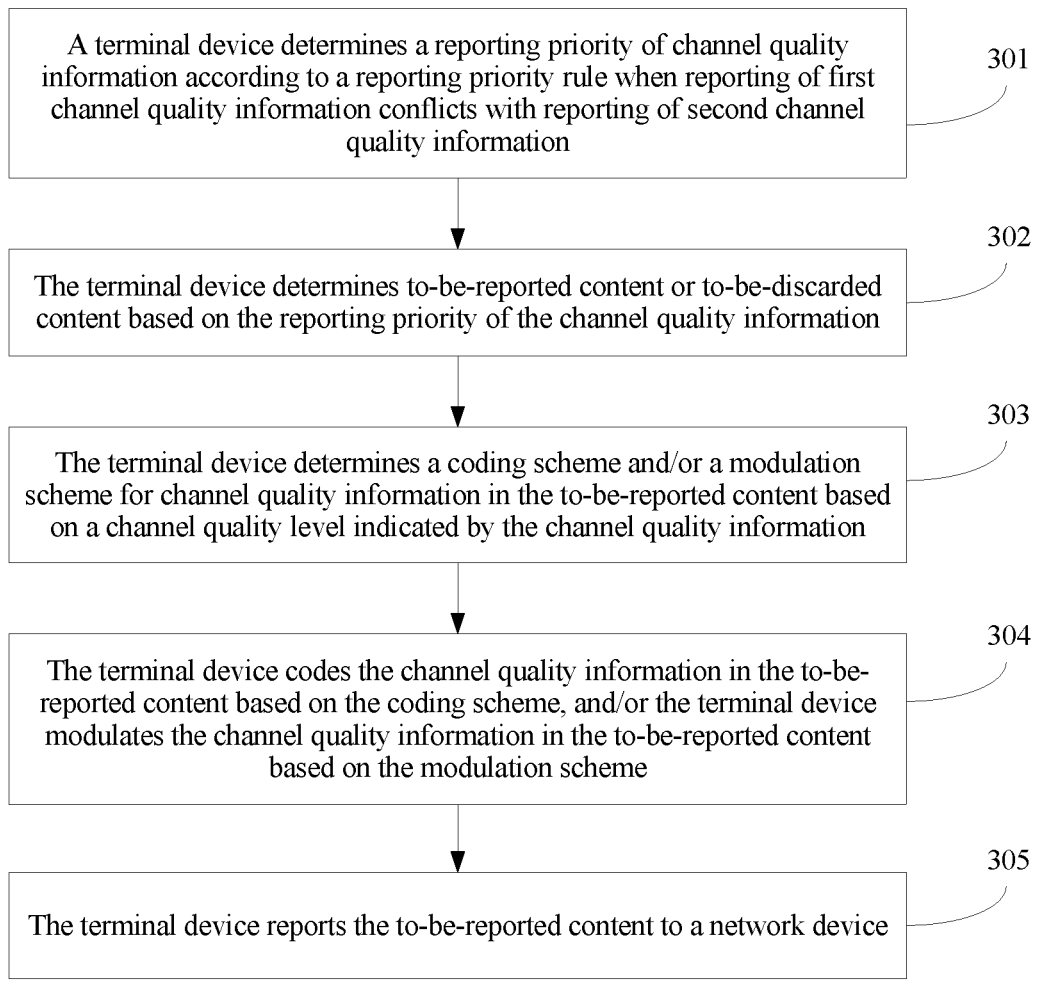
FIG. 3 is a method flowchart of a channel quality information transmission method according to an embodiment of this application.

Referring to FIG. 3, FIG. 3 is a method flowchart of a channel quality information transmission method according to an embodiment of this application. The channel quality information transmission method may be used by a terminal device to report first channel quality information and second channel quality information to a network device based on a reference signal sent by the network device. The network device may be the network device 001 in the implementation environment shown in FIG. 2, and the terminal device may be the terminal device 002 in the implementation environment shown in FIG. 2. Referring to FIG. 3, the method includes the following steps.

Step 301: The terminal device determines a reporting priority of channel quality information according to a reporting priority rule when reporting of first channel quality information conflicts with reporting of second channel quality information.

In this embodiment of this application, the terminal device may report the first channel quality information and the second channel quality information to the network device. The first channel quality information and the second channel quality information may be obtained by the terminal device by performing channel measurement based on a same reference signal, or may be obtained by the terminal device by performing channel measurement based on different reference signals. This is not limited in this embodiment of this application. Generally, the terminal device may separately report the first channel quality information and the second channel quality information to the network device in different time units. However, in actual application, the first channel quality information and the second channel quality information may need to be simultaneously reported to the network device. In this case, reporting of the first channel quality information conflicts with reporting of the second channel quality information. The reporting conflict may mean that a reporting time of the first channel quality information conflicts with a reporting time of the second channel quality information (to be specific, the first channel quality information and the second channel quality information are reported in a same time unit), and a quantity of time-frequency resources occupied by the first channel quality information and the second channel quality information exceeds a maximum time-frequency resource carrying capacity of a PUCCH. That is, the terminal device needs to report the first channel quality information and the second channel quality information to the network device in a same time unit. The time unit may be a timeslot or a transmission time interval (TTI).

In this embodiment of this application, the terminal device may determine the reporting priority of the channel quality information according to the reporting priority rule when reporting of the first channel quality information conflicts with reporting of the second channel quality information. The channel quality information may include the first channel quality information and the second channel quality information, the channel quality information may indicate channel quality, and a content type of at least one of the first channel quality information and the second channel quality information is a first type. It should be noted that in actual application, the channel quality information may further indicate a reference signal resource index (CSI-RS resource indicator, CRI) or an index of a synchronization signal block (SS block). The SS block may include at least one of a primary synchronization signal (PSS), a secondary synchronization signal (SSS), and a physical broadcast channel (PBCH). This is not limited in this embodiment of this application.

In this embodiment of this application, both the first channel quality information and the second channel quality information have a time domain type, and both the first channel quality information and the second channel quality information have a content type. The reporting priority rule may include the following rule R1 or the following rule R2.

Rule R1: When the first channel quality information and the second channel quality information are the same in terms of time domain type and are different in terms of content type, the reporting priority of the channel quality information is determined based on a content type of the channel quality information and/or a channel quality level.

Rule R2: When the first channel quality information and the second channel quality information are different in terms of time domain type and are the same or different in terms of content type, the reporting priority of the channel quality information is determined based on a time domain type of the channel quality information and/or a channel quality level.

It should be noted that, the terminal device may usually use the rule R1 or the rule R2 to determine the reporting priority of the channel quality information in a process of reporting the channel quality information. Therefore, an example in which the reporting priority rule includes the rule R1 or the rule R2 is used for description in this embodiment of this application. However, the terminal device may usually use the rule R1 and the rule R2 to determine the reporting priority of the channel quality information in different reporting processes. For example, in a first reporting process, the terminal device uses the rule 1 to determine the reporting priority of the channel quality information. In a second reporting process, the terminal device uses the rule R2 to determine the reporting priority of the channel quality information. Therefore, in an actual standard, both the rule R1 and the rule R2 may exist. In other words, the reporting priority rule may include at least one of the rule R1 and the rule R2. This is not limited in this embodiment of this application.

In this embodiment of this application, the time domain type of the channel quality information may be reporting of the channel quality information in time domain. The time domain type may include at least one of periodic (P) reporting, semi-periodic (SP) reporting, and aperiodic (AP) reporting. A time domain type of the first channel quality information may be the same as or different from a time domain type of the second channel quality information. The content type of the channel quality information may include a first type and a second type, the first type is different from the second type, and the content type of the at least one of the first channel quality information and the second channel quality information is the first type. Optionally, both a content type of the first channel quality information and a content type of the second channel quality information are the first type, or a content type of the first channel quality information is the first type, and a content type of the second channel quality information is the second type.

When both the content type of the first channel quality information and the content type of the second channel quality information are the first type, the time domain type of the first channel quality information is different from the time domain type of the second channel quality information. When the content type of the first channel quality information is the first type and the content type of the second channel quality information is the second type, the time domain type of the first channel quality information may be the same as or different from the time domain type of the second channel quality information. For example, when both the content type of the first channel quality information and the content type of the second channel quality information are the first type, the time domain type of the first channel quality information is periodic reporting, and the time domain type of the second channel quality information is aperiodic reporting or semi-periodic reporting; or the time domain type of the first channel quality information is semi-periodic reporting, and the time domain type of the second channel quality information is periodic reporting or aperiodic reporting; or the time domain type of the first channel quality information is aperiodic reporting, and the time domain type of the second channel quality information is periodic reporting or semi-periodic reporting. When the content type of the first channel quality information is the first type and the content type of the second channel quality information is the second type, the time domain type of the first channel quality information is periodic reporting, and the time domain type of the second channel quality information is periodic reporting, semi-periodic reporting, or aperiodic reporting; or the time domain type of the first channel quality information is semi-periodic reporting, and the time domain type of the second channel quality information is periodic reporting, semi-periodic reporting, or aperiodic reporting; or the time domain type of the first channel quality information is aperiodic reporting, and the time domain type of the second channel quality information is periodic reporting, semi-periodic reporting, or aperiodic reporting.

In this embodiment of this application, channel quality information whose content type is the first type may include at least one of an identifier of a reference signal resource and quality information of the reference signal resource, and the quality information of the reference signal resource includes at least one of a reference signal received power (RSRP), reference signal received quality, and a channel quality indicator. For example, the identifier of the reference signal resource may be a CRI. Channel quality information whose content type is the second type may include at least one of an identifier of a reference signal resource, a rank indicator, a precoding matrix indicator, and a channel quality indicator. Optionally, when both the content type of the first channel quality information and the content type of the second channel quality information are the first type, the first channel quality information includes at least one of the identifier of the reference signal resource and the quality information of the reference signal resource, and the second channel quality information includes at least one of the identifier of the reference signal resource and the quality information of the reference signal resource. When the content type of the first channel quality information is the first type and the content type of the second channel quality information is the second type, the first channel quality information includes at least one of the identifier of the reference signal resource and the quality information of the reference signal resource, and the second channel quality information includes at least one of the identifier of the reference signal resource, the rank indicator, the precoding matrix indicator, and the channel quality indicator. In this embodiment of this application, the channel quality information whose content type is the first type may be, for example, BSI, and the channel quality information whose content type is the second type may be, for example, CSI in LTE. Therefore, in the standard, the channel quality information whose content type is the first type may be included in beam report or L1-RSRP report (layer 1-reference signal received power report), and the channel quality information whose content type is the second type may be included in CSI reporting (channel state report).

In this embodiment of this application, if the content type of the first channel quality information is the same as or different from the content type of the second channel quality information, the first channel quality information may be divided into two parts: part 1 and part 2. In addition, the second channel quality information may also be divided into two parts: part 1 and part 2. Specifically, the following three cases may be included:

Case (1): When both the content type of the first channel quality information and the content type of the second channel quality information are the first type, the content type of the first channel quality information is the same as the content type of the second channel quality information. The first channel quality information may include N pieces of channel quality information whose content type is the first type, the N pieces of channel quality information may include X pieces of channel quality information and Y pieces of channel quality information, and channel quality indicated by any one of the X pieces of channel quality information may be higher than channel quality indicated by any one of the Y pieces of channel quality information, where X+Y≤N, and X, Y, and N all are integers greater than or equal to 1. The second channel quality information may include M pieces of channel quality information whose content type is the first type, the M pieces of channel quality information may include V pieces of channel quality information and Q pieces of channel quality information, and channel quality indicated by any one of the V pieces of channel quality information may be higher than channel quality indicated by any one of the Q pieces of channel quality information, where V+Q≤M, and V, Q, and M all are integers greater than or equal to 1. In other words, when both the content type of the first channel quality information and the content type of the second channel quality information are the first type, the first channel quality information and the second channel quality information each may be divided into two parts: part 1 and part 2. The two parts of the first channel quality information and the two parts of the second channel quality information are separately as follows:

For the first channel quality information, part 1 includes X pieces of channel quality information, and part 2 includes Y pieces of channel quality information.

For the second channel quality information, part 1 includes V pieces of channel quality information, and part 2 includes Q pieces of channel quality information.

For example, when the first channel quality information and the second channel quality information are BSI of different time domain types, the two parts of the first channel quality information and the two parts of the second channel quality information are separately as follows:

For the first channel quality information, BSI_part 1 includes X pieces of BSI, and BSI_part 2 includes Y pieces of BSI.

For the second channel quality information, BSI_part 1 includes V pieces of BSI, and BSI_part 2 includes Q pieces of BSI.

Case (2): When the content type of the first channel quality information is the first type and the content type of the second channel quality information is the second type, the content type of the first channel quality information is different from the content type of the second channel quality information. The first channel quality information may include N pieces of channel quality information whose content type is the first type, the N pieces of channel quality information may include X pieces of channel quality information and Y pieces of channel quality information, and channel quality indicated by any one of the X pieces of channel quality information may be higher than channel quality indicated by any one of the Y pieces of channel quality information, where X+Y≤N, and X, Y, and N all are integers greater than or equal to 1. The second channel quality information may include K pieces of channel quality information whose content type is the second type, where K is an integer greater than or equal to 1. In other words, when the content type of the first channel quality information is the first type and the content type of the second channel quality information is the second type, the first channel quality information may be divided into two parts: part 1 and part 2. The two parts of the first channel quality information may be as follows:

For the first channel quality information, part 1 includes X pieces of channel quality information, and part 2 includes Y pieces of channel quality information.

For example, when the first channel quality information is BSI, the two parts of the first channel quality information may be as follows:

For the first channel quality information, BSI_part 1 includes X pieces of BSI, and BSI_part 2 includes Y pieces of BSI.

Case (3): When the content type of the first channel quality information is the first type and the content type of the second channel quality information is the second type, the content type of the first channel quality information is different from the content type of the second channel quality information. The first channel quality information may include N pieces of channel quality information whose content type is the first type, the N pieces of channel quality information may include X pieces of channel quality information and Y pieces of channel quality information, and channel quality indicated by any one of the X pieces of channel quality information may be higher than channel quality indicated by any one of the Y pieces of channel quality information, where X+Y≤N, and X, Y, and N all are integers greater than or equal to 1. The second channel quality information may include K pieces of channel quality information whose content type is the second type, the K pieces of channel quality information may include U pieces of channel quality information and W pieces of channel quality information, and channel quality indicated by any one of the U pieces of channel quality information may be higher than channel quality indicated by any one of the W pieces of channel quality information, where U+W≤K, and both U and W are integers greater than or equal to 1. In other words, when the content type of the first channel quality information is the first type and the content type of the second channel quality information is the second type, the first channel quality information and the second channel quality information each may be divided into two parts: part 1 and part 2. The two parts of the first channel quality information and the two parts of the second channel quality information are separately as follows:

For the first channel quality information, part 1 includes X pieces of channel quality information, and part 2 includes Y pieces of channel quality information.

For the second channel quality information, part 1 includes U pieces of channel quality information, and part 2 includes W pieces of channel quality information.

For example, when the first channel quality information is BSI, and the second channel quality information is CSI, the two parts of the first channel quality information and the two parts of the second channel quality information are separately as follows:

For the first channel quality information, BSI_part 1 includes X pieces of BSI, and BSI_part 2 includes Y pieces of BSI.

For the second channel quality information, CSI_part 1 includes U pieces of CSI, and CSI_part 2 includes W pieces of CSI.

It should be noted that, in the foregoing three cases in this embodiment of this application, M and N each are a quantity, preconfigured by the network device or predefined, of pieces of channel quality information that needs to be reported by the terminal device to the network device and whose content type is the first type. The M pieces of channel quality information and the N pieces of channel quality information are different in terms of time domain type. K is a quantity, preconfigured by the network device or predefined, of pieces of channel quality information that needs to be reported by the terminal device to the network device and whose content type is the second type. A ratio of X to Y, a ratio of P to Q, and a ratio of U to W all may be predefined by a system, or may be preconfigured by the network device for the terminal device. X, P, and U may be equal or not equal, Y, N, and W may be equal or not equal, and M, N, and K may be equal or not equal. Values of X, P, U, Y, N, W, M, N, and K are not limited in this embodiment of this application.

It should be further noted that, in the first channel quality information, the channel quality indicated by any one of the X pieces of channel quality information is higher than the channel quality indicated by any one of the Y pieces of channel quality information. Therefore, in actual application, the terminal device may rank the N pieces of channel quality information based on a channel quality level, determine the X pieces of channel quality information indicating highest channel quality in the N pieces of channel quality information as part 1 of the first channel quality information, and then select the Y pieces of channel quality information from remaining channel quality information as part 2 of the first channel quality information. The Y pieces of channel quality information may be Y pieces of channel quality information indicating lowest channel quality in the N pieces of channel quality information, or may be Y pieces of channel quality information randomly selected from the remaining channel quality information. This is not limited in this embodiment of this application. A process of dividing the second channel quality information into part 1 and part 2 is similar to a process of dividing the first channel quality information into part 1 and part 2, and details are not described in this embodiment of this application.

Optionally, in this embodiment of this application, content of the X pieces of channel quality information is the same as content of the Y pieces of channel quality information. For example, each of the X pieces of channel quality information includes a CRI and an RSRP, and each of the Y pieces of channel quality information includes a CRI and an RSRP. An RSRP of any one of the X pieces of channel quality information is greater than an RSRP of any one of the Y pieces of channel quality information. Content of the U pieces of channel quality information may be different from content of the W pieces of channel quality information. For example, each of the U pieces of channel quality information includes an RI and a CQI 1, and each of the W pieces of channel quality information includes a PMI and a CQI 2, or the U pieces of channel quality information include channel quality information (e.g., CSI) of an even-numbered sub-band, and the W pieces of channel quality information include channel quality information (e.g., CSI) of an odd-numbered sub-band. That CSI is divided into CSI_part 1 and CSI_part 2 is determined according to the prior art, and this is not limited in this embodiment of this application.

In this embodiment of this application, if the time domain type of the first channel quality information is the same as or different from the time domain type of the second channel quality information, and the content type of the first channel quality information is the same as or different from the content type of the second channel quality information, the reporting priority rule may specifically include the following three aspects:

In a first aspect, when the first channel quality information and the second channel quality information are the same in terms of time domain type and are different in terms of content type, the terminal device may determine the reporting priority of the channel quality information according to the rule R1. In actual implementation, the rule R1 may specifically include the following two cases. In other words, the rule R1 may include the following two sub-rules:

Rule R11: A reporting priority of the first type of the X pieces of channel quality information is higher than or equal to a reporting priority of the second type of the second channel quality information, and the reporting priority of the second type of the second channel quality information is higher than or equal to a reporting priority of the first type of the Y pieces of channel quality information.

Rule R12: A reporting priority of the first type of the X pieces of channel quality information is higher than or equal to a reporting priority of the first type of the Y pieces of channel quality information, and the reporting priority of the first type of the Y pieces of channel quality information is higher than or equal to a reporting priority of the second type of the second channel quality information.

For example, when the first channel quality information is BSI, the second channel quality information is CSI, the first type of the X pieces of channel quality information is part 1 of the first channel quality information, and the first type of the Y pieces of channel quality information is part 2 of the first channel quality information, a symbol "≥" is used to indicate a reporting priority level. In this case, the rule R11 and the rule R12 may be as follows:

Rule R11: BSI_part 1≥CSI≥BSI_part 2.
Rule R12: BSI_part 1≥BSI_part 2≥CSI.

It should be noted that, an example in which only the first channel quality information is divided into part 1 and part 2 is used to describe a case in which the rule R1 includes the rule R11 and the rule R12. In other words, the case in which the rule R1 includes the rule R11 and the rule R12 is specifically described for the rule R1 in the case (2). In actual application, when the first channel quality information and the second channel quality information are different in terms of content type, the second channel quality information may be divided into part 1 and part 2 in addition to dividing the first channel quality information into part 1 and part 2. That is, the rule R1 may be further specifically described in the case (3). In this case, the rule R1 may include the following three sub-rules:

Rule R11: A reporting priority of the first type of the X pieces of channel quality information is higher than or equal to a reporting priority of the second type of the second channel quality information, and the reporting priority of the second type of the second channel quality information is higher than or equal to a reporting priority of the first type of the Y pieces of channel quality information.

Rule R12: A reporting priority of the first type of the X pieces of channel quality information is higher than or equal to a reporting priority of the first type of the Y pieces of channel quality information, and the reporting priority of the first type of the Y pieces of channel quality information is higher than or equal to a reporting priority of the second type of the second channel quality information.

Rule R13: A reporting priority of the first type of the X pieces of channel quality information is higher than or equal to a reporting priority of the second type of the U pieces of channel quality information, the reporting priority of the second type of the U pieces of channel quality information is higher than or equal to a reporting priority of the first type of the Y pieces of channel quality information, and the reporting priority of the first type of the Y pieces of channel quality information is higher than or equal to a reporting priority of the second type of the W pieces of channel quality information.

For example, when the first channel quality information is BSI, the second channel quality information is CSI, the first type of the X pieces of channel quality information is part 1 of the first channel quality information, the first type of the Y pieces of channel quality information is part 2 of the first channel quality information, the second type of the U pieces of channel quality information is part 1 of the second channel quality information, and the second type of the W pieces of channel quality information is part 2 of the second channel quality information, a symbol "≥" is used to indicate a reporting priority level. In this case, the rule R11 to the rule R13 may be as follows:

Rule R11: BSI_part 1≥CSI≥BSI_part 2.
Rule R12: BSI_part 1≥BSI_part 2≥CSI.
Rule R13: BSI_part 1≥CSI_part 1≥BSI_part 2≥CSI_part 2.

In a second aspect, when the first channel quality information and the second channel quality information are different in terms of time domain type and content type, the terminal device may determine the reporting priority of the channel quality information according to the rule R2. In actual implementation, the rule R2 may specifically include the following four cases. In other words, the rule R2 may include the following four sub-rules:

Rule R21a: A reporting priority of the first type of the first channel quality information reported aperiodically is higher than or equal to a reporting priority of the second type of the second channel quality information reported periodically.

Rule R22a: A reporting priority of the second type of the second channel quality information reported aperiodically is higher than or equal to a reporting priority of the first type of the first channel quality information reported periodically.

Rule R23a: The reporting priority of the first type of the first channel quality information reported aperiodically is higher than or equal to a reporting priority of the second type of the second channel quality information reported semi-periodically.

Rule R24a: The reporting priority of the second type of the second channel quality information reported aperiodically is higher than or equal to a reporting priority of the first type of the first channel quality information reported semi-periodically.

For example, when the first channel quality information is BSI, and the second channel quality information is CSI, P indicates periodic reporting, SP indicates semi-periodic reporting, AP indicates aperiodic reporting, and a symbol "≥" is used to indicate a reporting priority level. In this case, the rule R21a to the rule R24a may be as follows:

Rule R21a: AP BSI≥P CSI.
Rule R22a: AP CSI≥P BSI.
Rule R23a: AP BSI≥SP CSI.
Rule R24a: AP CSI≥SP BSI.

In a third aspect, when the first channel quality information and the second channel quality information are different in terms of time domain type and are the same in terms of content type, the terminal device may determine the reporting priority of the channel quality information according to the rule R2. In actual implementation, the rule R2 may specifically include the following 12 cases. In other words, the rule R2 may include the following 12 sub-rules:

Rule R21b: A reporting priority of the first type of the first channel quality information reported aperiodically is higher than or equal to a reporting priority of the first type of the first channel quality information reported periodically.

Rule R22b: The reporting priority of the first type of the first channel quality information reported aperiodically is higher than or equal to a reporting priority of the first type of the first channel quality information reported semi-periodically.

Rule R23b: The reporting priority of the first type of the first channel quality information reported semi-periodically is higher than or equal to the reporting priority of the first type of the first channel quality information reported periodically.

Rule R24b: A reporting priority of the first type of the Y pieces of channel quality information reported aperiodically is higher than or equal to a reporting priority of the first type of the Q pieces of channel quality information reported periodically.

Rule R25b: The reporting priority of the first type of the Y pieces of channel quality information reported aperiodically is higher than or equal to a reporting priority of the first type of the Q pieces of channel quality information reported semi-periodically.

Rule R26b: A reporting priority of the first type of the Y pieces of channel quality information reported semi-periodically is higher than or equal to the reporting priority of the first type of the Q pieces of channel quality information reported periodically.

Rule R27b: A reporting priority of the first type of the X pieces of channel quality information reported aperiodically is higher than or equal to a reporting priority of the first type of the V pieces of channel quality information reported periodically.

Rule R28b: The reporting priority of the first type of the X pieces of channel quality information reported aperiodically is higher than or equal to a reporting priority of the first type of the V pieces of channel quality information reported semi-periodically.

Rule R29b: A reporting priority of the first type of the X pieces of channel quality information reported semi-periodically is higher than or equal to the reporting priority of the first type of the V pieces of channel quality information reported periodically.

Rule R210b: A reporting priority of the first type of the X pieces of channel quality information reported periodically is higher than or equal to a reporting priority of the first type of the Q pieces of channel quality information reported aperiodically.

Rule R211b: The reporting priority of the first type of the X pieces of channel quality information reported semi-periodically is higher than or equal to the reporting priority of the first type of the Q pieces of channel quality information reported aperiodically.

Rule R212b: The reporting priority of the first type of the X pieces of channel quality information reported periodically is higher than or equal to the reporting priority of the first type of the Q pieces of channel quality information reported semi-periodically.

For example, when the first channel quality information is BSI of different time domains, the first type of the X pieces of channel quality information is part 1 of the first channel quality information, the first type of the Y pieces of channel quality information is part 2 of the first channel quality information, the first type of the V pieces of channel quality information is part 1 of the second channel quality information, the first type of the Q pieces of channel quality information is part 2 of the second channel quality information, the X pieces of channel quality information and the V pieces of channel quality information are channel quality information of different time domains, and the Y pieces of channel quality information and the Q pieces of channel quality information are channel quality information of different time domains, P indicates periodic reporting, SP indicates semi-periodic reporting, AP indicates aperiodic reporting, and a symbol "≥" is used to indicate a reporting priority level. In this case, the rule R21a to the rule R24a may be as follows:

Rule R21b: AP BSI≥P BSI.
Rule R22b: AP BSI≥SP BSI.
Rule R23b: SP BSI≥P BSI.
Rule R24b: AP BSI_part 2≥P BSI_part 2.
Rule R25b: AP BSI_part 2≥SP BSI_part 2.
Rule R26b: SP BSI_part 2≥P BSI_part 2.
Rule R27b: AP BSI_part 1≥P BSI_part 1.
Rule R28b: AP BSI_part 1≥SP BSI_part 1.
Rule R29b: SP BSI_part 1≥P BSI_part 1.
Rule R210b: P BSI_part 1≥AP BSI_part 2.
Rule R211b: SP BSI_part 1≥AP BSI_part 2.
Rule R212b: P BSI_part 1≥SP BSI_part 2.

Step 302: The terminal device determines to-be-reported content or to-be-discarded content based on the reporting priority of the channel quality information.

After determining the reporting priority of the channel quality information, the terminal device may determine the to-be-reported content or the to-be-discarded content based on the reporting priority of the channel quality information. Optionally, the terminal device may extract channel quality information from the first channel quality information and the second channel quality information as the to-be-reported content based on the reporting priority of the channel quality information and in descending order of reporting priorities, and content other than the to-be-reported content in the first channel quality information and the second channel quality information is the to-be-discarded content. Alternatively, the terminal device may extract channel quality information from the first channel quality information and the second channel quality information as the to-be-discarded content based on the reporting priority of the channel quality information and in ascending order of reporting priorities, and content other than the to-be-discarded content in the first channel quality information and the second channel quality information is the to-be-reported content.

It should be noted that, in actual application, step 301 may be performed when reporting of the first channel quality information conflicts with reporting of the second channel quality information, and the quantity of time-frequency resources occupied by the first channel quality information and the second channel quality information exceeds the maximum time-frequency resource carrying capacity of the PUCCH. Therefore, in step 302, a quantity of time-frequency resources occupied by the to-be-reported content determined by the terminal device may be less than or equal to the maximum time-frequency resource carrying capacity of the PUCCH, to facilitate channel quality information reporting.

It should be further noted that, in this embodiment of this application, an example in which the terminal device determines the to-be-reported content or the to-be-discarded content based on the reporting priority of the channel quality information is used for description. In actual application, when reporting of the first channel quality information conflicts with reporting of the second channel quality information, the terminal device may further determine a discarding priority of the channel quality information according to a discarding priority rule, and determine the to-be-reported content or the to-be-discarded content based on the discarding priority of the channel quality information. That is, step 301 and step 302 may be replaced with step 301a and step 302a.

Step 301a: The terminal device determines a discarding priority of channel quality information according to a discarding priority rule when reporting of first channel quality information conflicts with reporting of second channel quality information.

The discarding priority rule may be a rule opposite to the reporting priority rule in step 301. Specifically, the discarding priority rule may include the following rule D1 or the following rule D2.

Rule D1: When the first channel quality information and the second channel quality information are the same in terms of time domain type and are different in terms of content type, the discarding priority of the channel quality information is determined based on the content type of the channel quality information and/or the channel quality level.

Rule D2: When the first channel quality information and the second channel quality information are different in terms of time domain type and are the same or different in terms of content type, the discarding priority of the channel quality information is determined based on the time domain type of the channel quality information and/or the channel quality level.

In this embodiment of this application, if the time domain type of the first channel quality information is the same as or different from the time domain type of the second channel quality information, and the content type of the first channel quality information is the same as or different from the content type of the second channel quality information, the discarding priority rule may specifically include the following three aspects:

In a first aspect, when the first channel quality information and the second channel quality information are the same in terms of time domain type and are different in terms of content type, the terminal device may determine the discarding priority of the channel quality information according to the rule D1. In actual implementation, the rule D1 may specifically include the following two cases. In other words, the rule D1 may include the following two sub-rules:

Rule D11: A discarding priority of the first type of the X pieces of channel quality information is lower than or equal to a discarding priority of the second type of the second channel quality information, and the discarding priority of the second type of the second channel quality information is lower than or equal to a discarding priority of the first type of the Y pieces of channel quality information.

Rule D12: A discarding priority of the first type of the X pieces of channel quality information is lower than or equal to a discarding priority of the first type of the Y pieces of channel quality information, and the discarding priority of the first type of the Y pieces of channel quality information is lower than or equal to a discarding priority of the second type of the second channel quality information.

For example, when the first channel quality information is BSI, the second channel quality information is CSI, the first type of the X pieces of channel quality information is part 1 of the first channel quality information, and the first type of the Y pieces of channel quality information is part 2 of the first channel quality information, a symbol "≤" is used to indicate a discarding priority level. In this case, the rule D11 and the rule D12 may be as follows:

Rule D11: BSI_part 1≤CSI≤BSI_part 2.
Rule D12: BSI_part 1≤BSI_part 2≤CSI.

In actual application, when the first channel quality information and the second channel quality information are different in terms of content type, the first channel quality information is divided into two parts: part 1 and part 2, and the second channel quality information is divided into two parts: part 1 and part 2, the rule D1 may include the following three sub-rules:

Rule D11: A discarding priority of the first type of the X pieces of channel quality information is lower than or equal to a discarding priority of the second type of the second channel quality information, and the discarding priority of the second type of the second channel quality information is lower than or equal to a discarding priority of the first type of the Y pieces of channel quality information.

Rule D12: A discarding priority of the first type of the X pieces of channel quality information is lower than or equal to a discarding priority of the first type of the Y pieces of channel quality information, and the discarding priority of the first type of the Y pieces of channel quality information is lower than or equal to a discarding priority of the second type of the second channel quality information.

Rule D13: A discarding priority of the first type of the X pieces of channel quality information is lower than or equal to a discarding priority of the second type of the U pieces of channel quality information, the discarding priority of the second type of the U pieces of channel quality information is lower than or equal to a discarding priority of the first type of the Y pieces of channel quality information, and the discarding priority of the first type of the Y pieces of channel quality information is lower than or equal to a discarding priority of the second type of the W pieces of channel quality information.

For example, when the first channel quality information is BSI, the second channel quality information is CSI, the first type of the X pieces of channel quality information is part 1 of the first channel quality information, the first type of the Y pieces of channel quality information is part 2 of the first channel quality information, the second type of the U pieces of channel quality information is part 1 of the second channel quality information, and the second type of the W pieces of channel quality information is part 2 of the second channel quality information, a symbol "≤" is used to indicate a discarding priority level. In this case, the rule D11 to the rule D13 may be as follows:

Rule D11: BSI_part 1≤CSI≤BSI_part 2.
Rule D12: BSI_part 1≤BSI_part 2≤CSI.
Rule D13: BSI_part 1≤CSI_part 1≤BSI_part 2≤CSI_part 2.

It should be noted that CSI is divided into CSI_part 1 and CSI_part 2, and discarding priorities (or reporting priorities) of the CSI_part 1 and the CSI_part 2 are determined according to the prior art. However, a discarding priority (or reporting priority) relationship between BSI and each of the CSI_part 1 and the CSI_part 2 when both the BSI and the CSI exist is not determined in the prior art.

In a second aspect, when the first channel quality information and the second channel quality information are different in terms of time domain type and content type, the terminal device may determine the discarding priority of the channel quality information according to the rule D2. In actual implementation, the rule D2 may specifically include the following four cases. In other words, the rule D2 may include the following four sub-rules:

Rule D21a: A discarding priority of the first type of the first channel quality information reported aperiodically is lower than or equal to a discarding priority of the second type of the second channel quality information reported periodically.

Rule D22a: A discarding priority of the second type of the second channel quality information reported aperiodically is lower than or equal to a discarding priority of the first type of the first channel quality information reported periodically.

Rule D23a: The discarding priority of the first type of the first channel quality information reported aperiodically is lower than or equal to a discarding priority of the second type of the second channel quality information reported semi-periodically.

Rule D24a: The discarding priority of the second type of the second channel quality information reported aperiodically is lower than or equal to a discarding priority of the first type of the first channel quality information reported semi-periodically.

For example, when the first channel quality information is BSI, and the second channel quality information is CSI, P indicates periodic reporting, SP indicates semi-periodic reporting, AP indicates aperiodic reporting, and a symbol "≤" is used to indicate a discarding priority level. In this case, the rule D21a to the rule D24a may be as follows:

Rule D21a: AP BSI≤P CSI.
Rule D22a: AP CSI≤P BSI.
Rule D23a: AP BSI≤SP CSI.
Rule D24a: AP CSI≤SP BSI.

In a third aspect, when the first channel quality information and the second channel quality information are different in terms of time domain type and are the same in terms of content type, the terminal device may determine the discarding priority of the channel quality information according to the rule D2. In actual implementation, the rule D2 may specifically include the following 12 cases. In other words, the rule D2 may include the following 12 sub-rules:

Rule D21b: A discarding priority of the first type of the first channel quality information reported aperiodically is lower than or equal to a discarding priority of the first type of the first channel quality information reported periodically.

Rule D22b: The discarding priority of the first type of the first channel quality information reported aperiodically is lower than or equal to a discarding priority of the first type of the first channel quality information reported semi-periodically.

Rule D23b: The discarding priority of the first type of the first channel quality information reported semi-periodically is lower than or equal to the discarding priority of the first type of the first channel quality information reported periodically.

Rule D24b: A discarding priority of the first type of the Y pieces of channel quality information reported aperiodically is lower than or equal to a discarding priority of the first type of the Q pieces of channel quality information reported periodically.

Rule D25b: The discarding priority of the first type of the Y pieces of channel quality information reported aperiodically is lower than or equal to a discarding priority of the first type of the Q pieces of channel quality information reported semi-periodically.

Rule D26b: A discarding priority of the first type of the Y pieces of channel quality information reported semi-periodically is lower than or equal to the discarding priority of the first type of the Q pieces of channel quality information reported periodically.

Rule D27b: A discarding priority of the first type of the X pieces of channel quality information reported aperiodically is lower than or equal to a discarding priority of the first type of the V pieces of channel quality information reported periodically.

Rule D28b: The discarding priority of the first type of the X pieces of channel quality information reported aperiodically is lower than or equal to a discarding priority of the first type of the V pieces of channel quality information reported semi-periodically.

Rule D29b: A discarding priority of the first type of the X pieces of channel quality information reported semi-periodically is lower than or equal to the discarding priority of the first type of the V pieces of channel quality information reported periodically.

Rule D210b: A discarding priority of the first type of the X pieces of channel quality information reported periodically is lower than or equal to a discarding priority of the first type of the Q pieces of channel quality information reported aperiodically.

Rule D211b: The discarding priority of the first type of the X pieces of channel quality information reported semi-periodically is lower than or equal to the discarding priority of the first type of the Q pieces of channel quality information reported aperiodically.

Rule D212b: The discarding priority of the first type of the X pieces of channel quality information reported periodically is lower than or equal to the discarding priority of the first type of the Q pieces of channel quality information reported semi-periodically.

For example, when the first channel quality information is BSI of different time domains, the first type of the X pieces of channel quality information is part 1 of the first channel quality information, the first type of the Y pieces of channel quality information is part 2 of the first channel quality information, the first type of the V pieces of channel quality information is part 1 of the first channel quality information, the first type of the Q pieces of channel quality information is part 2 of the first channel quality information, the X pieces of channel quality information and the V pieces of channel quality information are channel quality information of different time domains, and the Y pieces of channel quality information and the Q pieces of channel quality information are channel quality information of different time domains, P indicates periodic reporting, SP indicates semi-periodic reporting, AP indicates aperiodic reporting, and a symbol "≤" is used to indicate a discarding priority level. In this case, the rule D21a to the rule D24a may be as follows:

Rule D21b: AP BSI≤P BSI.
Rule D22b: AP BSI≤SP BSI.
Rule D23b: SP BSI≤P BSI.
Rule D24b: AP BSI_part 2≤P BSI_part 2.
Rule D25b: AP BSI_part 2≤SP BSI_part 2.
Rule D26b: SP BSI_part 2≤P BSI_part 2.
Rule D27b: AP BSI_part 1≤P BSI_part 1.
Rule D28b: AP BSI_part 1≤SP BSI_part 1.
Rule D29b: SP BSI_part 1≤P BSI_part 1.
Rule D210b: P BSI_part 1≤AP BSI_part 2.
Rule D211b: SP BSI_part 1≤AP BSI_part 2.
Rule D212b: P BSI_part 1≤SP BSI_part 2.

Step 302a: The terminal device determines to-be-reported content or to-be-discarded content based on the discarding priority of the channel quality information.

After determining the discarding priority of the channel quality information, the terminal device may determine the to-be-reported content or the to-be-discarded content based on the discarding priority of the channel quality information. Optionally, the terminal device may extract channel quality information from the first channel quality information and the second channel quality information as the to-be-discarded content based on the discarding priority of the channel quality information and in descending order of discarding priorities, and content other than the to-be-discarded content in the first channel quality information and the second channel quality information is the to-be-reported content. Alternatively, the terminal device may extract channel quality information from the first channel quality information and the second channel quality information as the to-be-reported content based on the discarding priority of the channel quality information and in ascending order of discarding priorities, and content other than the to-be-reported content in the first channel quality information and the second channel quality information is the to-be-discarded content.

It should be noted that, in actual application, 301a may be performed when reporting of the first channel quality information conflicts with reporting of the second channel quality information, and the quantity of time-frequency resources occupied by the first channel quality information and the second channel quality information exceeds the maximum time-frequency resource carrying capacity of the PUCCH. Therefore, in step 302a, a quantity of time-frequency resources occupied by the to-be-reported content determined by the terminal device may be less than or equal to the maximum time-frequency resource carrying capacity of the PUCCH, to facilitate channel quality information reporting. Optionally, the terminal device discards channel quality information from the first channel quality information and the second channel quality information in descending order of discarding priorities, until a quantity of time-frequency resources occupied by remaining channel quality information is less than or equal to the maximum time-frequency resource carrying capacity of the PUCCH.

Step 303: The terminal device determines a coding scheme and/or a modulation scheme for channel quality information in the to-be-reported content based on a channel quality level indicated by the channel quality information.

After determining the to-be-reported content from the first channel quality information and the second channel quality information, the terminal device may determine the coding scheme and/or the modulation scheme for the channel quality information in the to-be-reported content based on the channel quality level indicated by the channel quality information in the to-be-reported content.

In the coding scheme, a coding bit rate of channel quality information indicating high channel quality is less than or equal to a coding bit rate of channel quality information indicating low channel quality. In the modulation scheme, a distance between a time-frequency resource on which the channel quality information indicating high channel quality is located and a time-frequency resource on which a demodulation reference signal (DMRS) is located is less than or equal to a distance between a time-frequency resource on which the channel quality information indicating low channel quality is located and the time-frequency resource on which the DMRS is located. Optionally, in the modulation scheme, channel quality information on time-frequency resources that are located on two sides of the time-frequency resource on which the DMRS is located and that are at a same distance from the time-frequency resource on which the DMRS is located is the same, and that the channel quality information is the same means that the channel quality information is the same in terms of content type and time domain type, and content of the channel quality information is also the same.

Optionally, the channel quality information in the to-be-reported content may include at least one of an identifier a reference signal resource and quality information of the reference signal resource. For example, the identifier of the reference signal resource may be, for example, a CRI, and the quality information of the reference signal resource includes at least one of an RSRP, reference signal received quality, and a channel quality indicator. The terminal device may determine, based on a value of the RSRP, the channel quality level indicated by the channel quality information. Generally, channel quality indicated by channel quality information with a higher RSRP is higher than channel quality indicated by channel quality information with a lower RSRP.

Step 304: The terminal device codes the channel quality information in the to-be-reported content based on the coding scheme, and/or the terminal device modulates the channel quality information in the to-be-reported content based on the modulation scheme.

After determining the coding scheme and/or the modulation scheme for the channel quality information in the to-be-reported content, the terminal device may code the channel quality information in the to-be-reported content based on the coding scheme, and/or modulate the channel quality information in the to-be-reported content based on the modulation scheme.

Optionally, the terminal device uses a lower coding bit rate to code the channel quality information indicating high channel quality, and uses a higher coding bit rate to code the channel quality information indicating low channel quality. This can ensure coding reliability, and improve efficiency of feeding back the to-be-reported content. And/or, Optionally, the terminal device configures the channel quality information indicating high channel quality on a time-frequency resource closer to the time-frequency resource on which the DMRS is located, and configures the channel quality information indicating low channel quality on a time-frequency resource further away from the time-frequency resource on which the DMRS is located. The terminal device may configure same channel quality information on the time-frequency resources that are on the two sides of the time-frequency resource on which the DMRS is located and that are at the same distance from the time-frequency resource on which the DMRS is located.

For example, if channel quality information 1 and channel quality information 2 exist, channel quality indicated by the channel quality information 1 is higher than channel quality indicated by the channel quality information 2. The time-frequency resource on which the DMRS is located is a symbol 2, and a symbol 1, a symbol 3, and a symbol 4 all are idle symbols. In this case, the terminal device may configure the channel quality information 1 on the symbol 1 and the symbol 3, and configure the channel quality information 2 on the symbol 4. This is not limited in this embodiment of this application.

Step 305: The terminal device reports the to-be-reported content to the network device.

The terminal device may report the to-be-reported content to the network device after determining the to-be-reported content. Optionally, the terminal device may report the to-be-reported content to the network device in a differential reporting manner, to reduce reporting overheads.

In this embodiment of this application, the to-be-reported content may include a plurality of pieces of channel quality information (e.g., the X pieces of channel quality information whose content type is the first type). When reporting the to-be-reported content to the network device in a differential reporting manner, the terminal device may first determine referential channel quality information, and then determine one piece of differential channel quality information based on each of the plurality of pieces of channel quality information and the referential channel quality information, so as to obtain a plurality of pieces of differential channel quality information, and report the referential channel quality information and the plurality of pieces of differential channel quality information to the network device. The network device may restore each piece of channel quality information based on the referential channel quality information and each piece of differential channel quality information, so as to restore the plurality of pieces of channel quality information, that is, restore the to-be-reported content. The differential channel quality information may be a difference between the channel quality information and the referential channel quality information. Optionally, when the plurality of pieces of channel quality information are the X pieces of channel quality information whose content type is the first type, the X pieces of channel quality information may include referential channel quality information. The referential channel quality information may be channel quality information indicating highest channel quality in the X pieces of channel quality information, or the referential channel quality information may be channel quality information indicating lowest channel quality in the X pieces of channel quality information, or the referential channel quality information may be average channel quality information in the X pieces of channel quality information. This is not limited in this embodiment of this application.

Optionally, each piece of channel quality information may include a CRI and an RSRP, and therefore the to-be-reported content may include a plurality of RSRPs (e.g., X RSRPs). The terminal device first determines a referential RSRP, then determines a differential RSRP based on each of the plurality of RSRPs and the referential RSRP, and report the referential RSRP and the differential RSRP to the network device. The network device may restore an actual RSRP (the actual RSRP is an absolute value of the RSRP) based on the referential RSRP and the differential RSRP. The referential RSRP may be a highest RSRP or a lowest RSRP in the N RSRPs, or may be an average RSRP in the N RSRPs. This is not limited in this embodiment of this application.

It should be noted that after the terminal device reports the to-be-reported content to the network device, the network device may receive the to-be-reported content, and schedule the terminal device based on the to-be-reported content. For example, the network device indicates a beam used for data transmission to the terminal device. For a process in which the network device schedules the terminal device based on the to-be-reported content, refer to the prior art. This is not limited in this embodiment of this application.

In view of the above, according to the channel quality information transmission method provided in this embodiment of this application, the terminal device can determine the reporting priority according to the reporting priority rule when reporting of the first channel quality information conflicts with reporting of the second channel quality information, and determine the to-be-reported content or the to-be-discarded content based on the reporting priority. This can resolve a problem of relatively low reliability of reporting channel quality information, and improve the reliability of reporting the channel quality information. In addition, the terminal device can further determine the discarding priority according to the discarding priority rule when reporting of the first channel quality information conflicts with reporting of the second channel quality information, and determine the to-be-reported content or the to-be-discarded content based on the discarding priority. This can resolve the problem of relatively low reliability of reporting the channel quality information, and improve the reliability of reporting the channel quality information.

Figure 4:
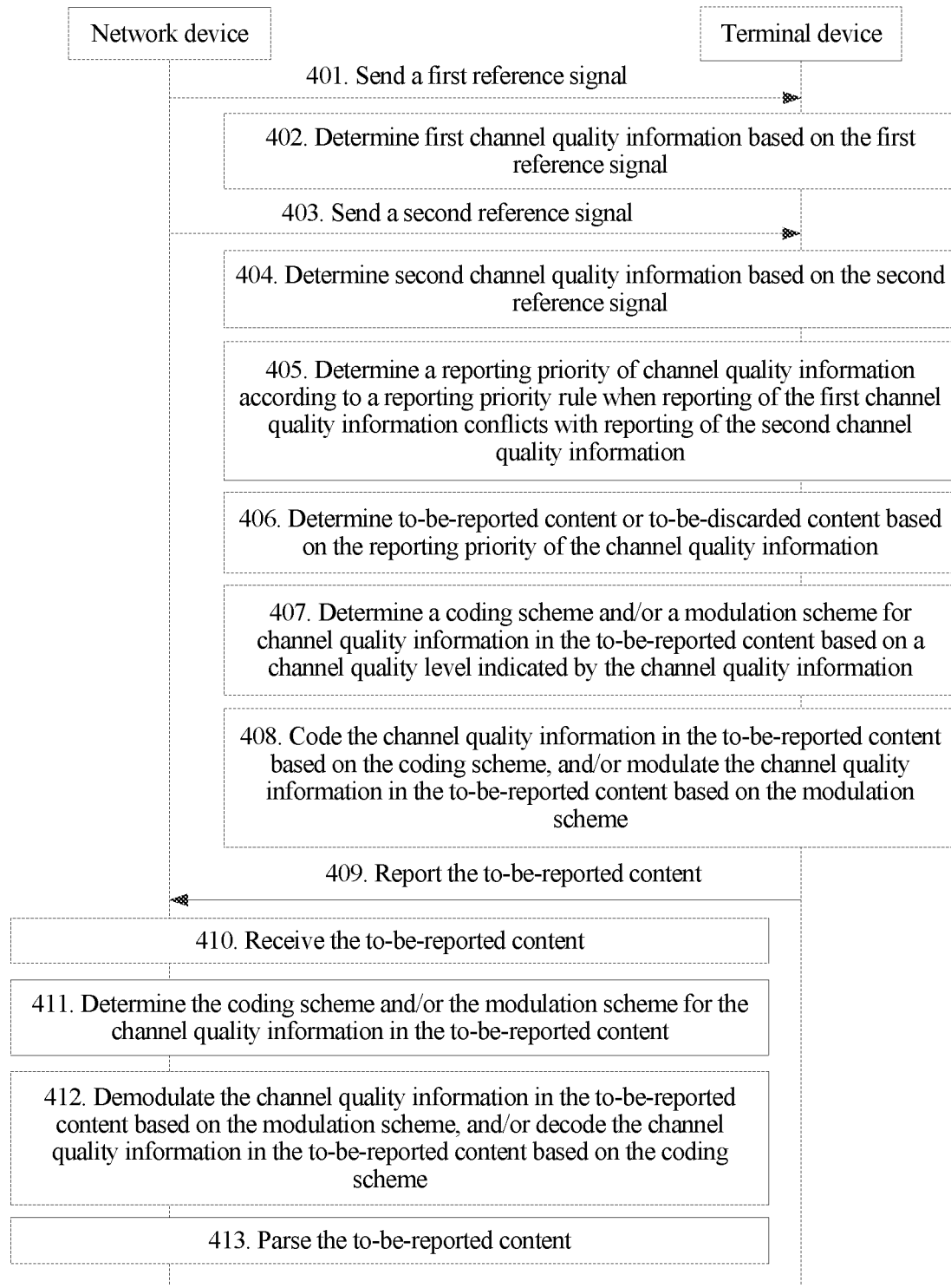
FIG. 4 is a method flowchart of another channel quality information transmission method according to an embodiment of this application.

Referring to FIG. 4, FIG. 4 is a method flowchart of another channel quality information transmission method according to an embodiment of this application. This embodiment is described by using an example in which the channel quality information transmission method is applied to the implementation environment shown in FIG. 1. Referring to FIG. 4, the method includes the following steps.

Step 401: A network device sends a first reference signal to a terminal device.

The network device may send the first reference signal to the terminal device. The first reference signal may be a reference signal used for channel state measurement or channel quality measurement. Optionally, the first reference signal may be a CSI-RS.

Step 402: The terminal device determines first channel quality information based on the first reference signal.

When the network device sends the first reference signal to the terminal device, the terminal device may receive the first reference signal, and determine the first channel quality information based on the first reference signal. Optionally, the terminal device performs channel measurement based on the first reference signal to obtain the first channel quality information.

Step 403: The network device sends a second reference signal to the terminal device.

The network device may send the second reference signal to the terminal device. The second reference signal may be the same as or different from the first reference signal, and the second reference signal and the first reference signal may be a same reference signal. Optionally, the second reference signal may be a CSI-RS.

It should be noted that, in this embodiment of this application, the network device may simultaneously send the first reference signal and the second reference signal to the terminal device, or may sequentially send the first reference signal and the second reference signal to the terminal device. When the network device sequentially sends the first reference signal and the second reference signal to the terminal device, the network device may first send the first reference signal to the terminal device and then send the second reference signal to the terminal device, or may first send the second reference signal to the terminal device and then send the first reference signal to the terminal device. Step 403 and step 401 may be simultaneously performed, or step 401 may be performed before step 403, or step 403 may be performed before step 401. This is not limited in this embodiment of this application.

Step 404: The terminal device determines second channel quality information based on the second reference signal.

When the network device sends the second reference signal to the terminal device, the terminal device may receive the second reference signal, and determine the second channel quality information based on the second reference signal. Optionally, the terminal device performs channel measurement based on the second reference signal to obtain the second channel quality information.

Step 405: The terminal device determines a reporting priority of channel quality information according to a reporting priority rule when reporting of the first channel quality information conflicts with reporting of the second channel quality information.

Step 406: The terminal device determines to-be-reported content or to-be-discarded content based on the reporting priority of the channel quality information.

Step 407: The terminal device determines a coding scheme and/or a modulation scheme for channel quality information in the to-be-reported content based on a channel quality level indicated by the channel quality information.

Step 408: The terminal device codes the channel quality information in the to-be-reported content based on the coding scheme, and/or the terminal device modulates the channel quality information in the to-be-reported content based on the modulation scheme.

Step 409: The terminal device reports the to-be-reported content to the network device.

For a detailed implementation process of step 405 to step 409, refer to step 301 to step 305 in the embodiment shown in FIG. 3. Step 405 may be replaced with step 401a, and step 406 may be replaced with step 402a. Details are not described in this embodiment of this application.

Step 410: The network device receives the to-be-reported content reported by the terminal device.

When the terminal device reports the to-be-reported content to the network device, the network device may receive the to-be-reported content reported by the terminal device.

Step 411: The network device determines the coding scheme and/or the modulation scheme for the channel quality information in the to-be-reported content.

After receiving the to-be-reported content reported by the terminal device, the network device may determine the coding scheme and/or the modulation scheme for the channel quality information in the to-be-reported content. In this embodiment of this application, the coding scheme and/or the modulation scheme may be agreed by the network device and the terminal device in advance, and the network device may determine the coding scheme and/or the modulation scheme for the channel quality information in the to-be-reported content according to the agreement with the terminal device.

In the modulation scheme, a distance between a time-frequency resource on which channel quality information indicating high channel quality is located and a time-frequency resource on which a DMRS is located is less than or equal to a distance between a time-frequency resource on which channel quality information indicating low channel quality is located and the time-frequency resource on which the DMRS is located. Optionally, in the modulation scheme, channel quality information on time-frequency resources that are located on two sides of the time-frequency resource on which the DMRS is located and that are at a same distance from the time-frequency resource on which the DMRS is located is the same, and that the channel quality information is the same means that the channel quality information is the same in terms of content type and time domain type, and content of the channel quality information is also the same. In the coding scheme, a coding bit rate of the channel quality information indicating high channel quality is less than or equal to a coding bit rate of the channel quality information indicating low channel quality.

Step 412: The network device demodulates the channel quality information in the to-be-reported content based on the modulation scheme, and/or the network device decodes the channel quality information in the to-be-reported content based on the coding scheme.

After determining the coding scheme and/or the modulation scheme in the to-be-reported content, the network device may demodulate the channel quality information in the to-be-reported content based on the modulation scheme, and/or the network device decodes the channel quality information in the to-be-reported content based on the coding scheme.

Optionally, the network device demodulates the channel quality information indicating high channel quality from a time-frequency resource closer to the time-frequency resource on which the DMRS is located, and the network device may demodulate same channel quality information from the time-frequency resources that are on the two sides of the time-frequency resource on which the DMRS is located and that are at the same distance from the time-frequency resource on which the DMRS is located.

Optionally, the network device uses a lower coding bit rate to decode the channel quality information that is demodulated from the time-frequency resource closer to the time-frequency resource on which the DMRS is located, and uses a higher coding bit rate to decode channel quality information that is demodulated from a time-frequency resource further away from the time-frequency resource on which the DMRS is located.

Step 413: The network device parses the to-be-reported content.

After demodulating and/or decoding the to-be-reported content, the network device may parse the to-be-reported content to obtain channel quality information actually reported by the terminal device. Optionally, because the terminal device reports the to-be-reported content to the network device in a differential reporting manner, the network device may parse the to-be-reported content to obtain referential channel quality information and a plurality of pieces of differential channel quality information, and then restore one piece of channel quality information based on the referential channel quality information and one piece of differential channel quality information, so as to restore a plurality of pieces of channel quality information, that is, restore the actual to-be-reported content. For a process in which the network device restores, based on the referential channel quality information and the differential channel quality information, the channel quality information actually reported by the terminal device, refer to the prior art. Details are not described in this embodiment of this application.

It should be noted that, each piece of channel quality information restored by the network device may include a CRI and an RSRP, and therefore the network device can restore a plurality of CRIs and a plurality of RSRPs in a one-to-one correspondence. The network device may determine a reference signal resource based on the CRI, determine, based on the RSRP, a reference signal received power of the reference signal resource indicated by the CRI, and schedule the terminal device based on the CRI and the RSRP. For example, the network device determines a highest RSRP from the plurality of RSRPs, and then sends indication information including a CRI corresponding to the highest RSRP to the terminal device, to instruct the terminal device to perform data transmission with the network device by using a reference signal resource indicated by the CRI corresponding to the highest RSRP. Alternatively, the network device determines several higher RSRPs from the plurality of RSRPs, and then sends indication information including CRIs corresponding to the several higher RSRPs to the terminal device, to instruct the terminal device to perform data transmission with the network device by using reference signal resources indicated by the CRIs corresponding to the several higher RSRPs. Details are not described in this embodiment of this application.

It should be further noted that, a quantity of pieces of channel quality information that needs to be reported by the terminal device to the network device is usually specified by the network device for the terminal device, or is agreed by the network device and the terminal device in advance. However, in a process in which the terminal device actually reports channel quality information to the network device, when reporting of the first channel quality information conflicts with reporting of the second channel quality information, the terminal device discards a part or all of content of the first channel quality information and/or the second channel quality information. After the network device restores channel quality information, the terminal device may further determine, based on the restored channel quality information, a CRI of channel quality information discarded by the terminal device. For example, the terminal device needs to report six pieces of channel quality information to the network device, and CRIs of the six pieces of channel quality information are a CRI 1 to a CRI 6. However, in practice, the network device restores only four pieces of channel quality information, and CRIs of the four pieces of channel quality information are the CRI 1 to the CRI 4. In this case, the network device may determine that the terminal device discards channel quality information including the CRI 5 and the CRI 6. For a process in which the network device parses the to-be-reported content and schedules the terminal device, refer to the prior art. Details are not described in this embodiment of this application.

In view of the above, according to the channel quality information transmission method provided in this embodiment of this application, the terminal device can determine the reporting priority according to the reporting priority rule when reporting of the first channel quality information conflicts with reporting of the second channel quality information, and determine the to-be-reported content or the to-be-discarded content based on the reporting priority. This can resolve a problem of relatively low reliability of reporting channel quality information, and improve the reliability of reporting the channel quality information. In addition, the terminal device can further determine a discarding priority according to a discarding priority rule when reporting of the first channel quality information conflicts with reporting of the second channel quality information, and determine the to-be-reported content or the to-be-discarded content based on the discarding priority. This can resolve the problem of relatively low reliability of reporting the channel quality information, and improve the reliability of reporting the channel quality information.

The following describes an embodiment of an apparatus in this application. The apparatus may be configured to perform the method embodiment of this application. For details not disclosed in the embodiment of the apparatus in this application, refer to the method embodiment of this application.

Figure 5:
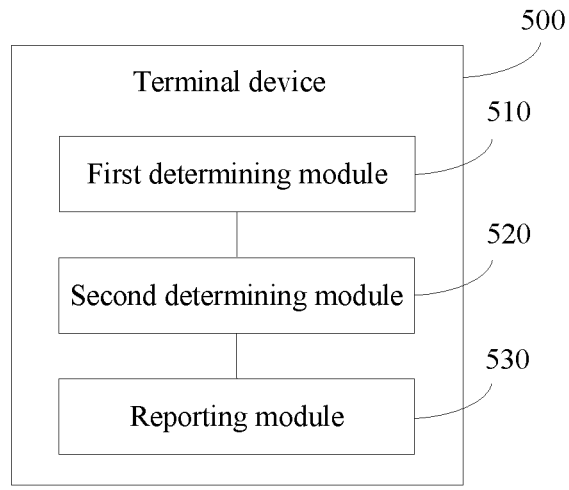
FIG. 5 is a block diagram of a terminal device according to an embodiment of this application.

Referring to FIG. 5, FIG. 5 is a block diagram of a terminal device 500 according to an embodiment of this application. The terminal device 500 may report channel quality information to a network device. The terminal device 500 may be the terminal device 002 in the implementation environment shown in FIG. 1, and the network device may be the network device 001 in the implementation environment shown in FIG. 1. Referring to FIG. 5, the terminal device 500 may include but is not limited to: a first determining module 510, configured to determine a reporting priority of channel quality information according to a reporting priority rule when reporting of first channel quality information conflicts with reporting of second channel quality information, where the channel quality information includes the first channel quality information and the second channel quality information, and the channel quality information indicates channel quality; a second determining module 520, configured to determine to-be-reported content or to-be-discarded content based on the reporting priority of the channel quality information; and a reporting module 530, configured to report the to-be-reported content to the network device.

The reporting priority rule includes: when the first channel quality information and the second channel quality information are the same in terms of time domain type and are different in terms of content type, determining the reporting priority of the channel quality information based on a content type of the channel quality information and/or a channel quality level; or when the first channel quality information and the second channel quality information are different in terms of time domain type and are the same or different in terms of content type, determining the reporting priority of the channel quality information based on a time domain type of the channel quality information and/or a channel quality level.

In view of the above, according to the terminal device provided in this embodiment of this application, the terminal device can determine the reporting priority according to the reporting priority rule when reporting of the first channel quality information conflicts with reporting of the second channel quality information, and determine the to-be-reported content or the to-be-discarded content based on the reporting priority. This can resolve a problem of relatively low reliability of reporting channel quality information, and improve the reliability of reporting the channel quality information.

Figure 6:
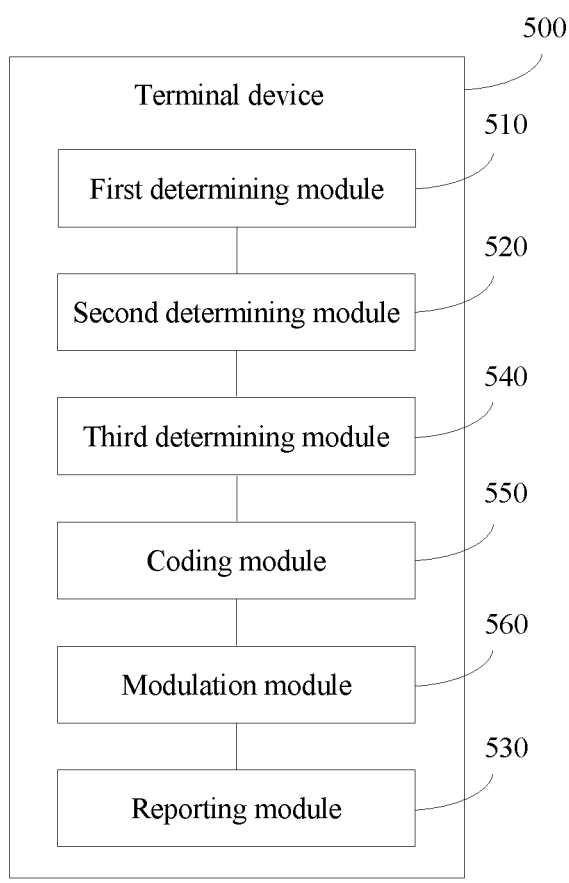
FIG. 6 is a block diagram of another terminal device according to an embodiment of this application.

Optionally, referring to FIG. 6, FIG. 6 is a block diagram of another terminal device 400 according to an embodiment of this application. Referring to FIG. 6, on the basis of FIG. 5, the terminal device 500 further includes: a third determining module 540, configured to determine a coding scheme and/or a modulation scheme for channel quality information in the to-be-reported content based on a channel quality level indicated by the channel quality information; and a coding module 550, configured to code the channel quality information in the to-be-reported content based on the coding scheme; and/or a modulation module 560, configured to modulate the channel quality information in the to-be-reported content based on the modulation scheme.

A coding bit rate of channel quality information indicating high channel quality is less than or equal to a coding bit rate of channel quality information indicating low channel quality; and/or a distance between a time-frequency resource on which the channel quality information indicating high channel quality is located and a time-frequency resource on which a demodulation reference signal DMRS is located is less than or equal to a distance between a time-frequency resource on which the channel quality information indicating low channel quality is located and the time-frequency resource on which the DMRS is located.

In view of the above, according to the terminal device provided in this embodiment of this application, the terminal device can determine the reporting priority according to the reporting priority rule when reporting of the first channel quality information conflicts with reporting of the second channel quality information, and determine the to-be-reported content or the to-be-discarded content based on the reporting priority. This can resolve a problem of relatively low reliability of reporting channel quality information, and improve the reliability of reporting the channel quality information.

Figure 7:
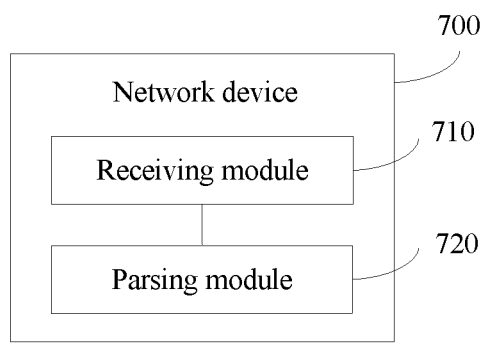
FIG. 7 is a block diagram of a network device according to an embodiment of this application.

Referring to FIG. 7, FIG. 7 is a block diagram of a network device 700 according to an embodiment of this application. The network device 700 may be the network device 001 in the implementation environment shown in FIG. 1. Referring to FIG. 7, the network device 700 may include but is not limited to: a receiving module 710, configured to receive to-be-reported content reported by a terminal device, where the to-be-reported content is reported by the terminal device to the network device after the terminal device determines a reporting priority of channel quality information according to a reporting priority rule when reporting of first channel quality information conflicts with reporting of second channel quality information, and determines the to-be-reported content or to-be-discarded content based on the reporting priority of the channel quality information, the channel quality information includes the first channel quality information and the second channel quality information, and the channel quality information indicates channel quality; and a parsing module 720, configured to parse the to-be-reported content to obtain the channel quality information.

The reporting priority rule includes: when the first channel quality information and the second channel quality information are the same in terms of time domain type and are different in terms of content type, determining the reporting priority of the channel quality information based on a content type of the channel quality information and/or a channel quality level; or when the first channel quality information and the second channel quality information are different in terms of time domain type and are the same or different in terms of content type, determining the reporting priority of the channel quality information based on a time domain type of the channel quality information and/or a channel quality level.

In view of the above, according to the network device provided in this embodiment of this application, the terminal device can determine the reporting priority according to the reporting priority rule when reporting of the first channel quality information conflicts with reporting of the second channel quality information, and determine the to-be-reported content or the to-be-discarded content based on the reporting priority. This can resolve a problem of relatively low reliability of reporting channel quality information, and improve the reliability of reporting the channel quality information.

Figure 8:
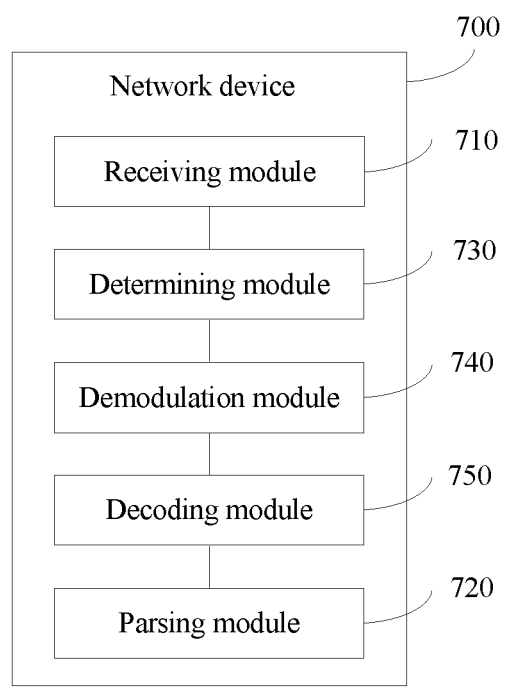
FIG. 8 is a block diagram of another network device according to an embodiment of this application.

Optionally, referring to FIG. 8, FIG. 8 is a block diagram of another network device 700 according to an embodiment of this application. Referring to FIG. 8, on the basis of FIG. 7, the network device 700 further includes: a determining module 730, configured to determine a coding scheme and/or a modulation scheme for channel quality information in the to-be-reported content; and a demodulation module 740, configured to demodulate the channel quality information in the to-be-reported content based on the modulation scheme; and/or a decoding module 750, configured to decode the channel quality information in the to-be-reported content based on the coding scheme.

A coding bit rate of channel quality information indicating high channel quality is less than or equal to a coding bit rate of channel quality information indicating low channel quality; and/or a distance between a time-frequency resource on which the channel quality information indicating high channel quality is located and a time-frequency resource on which a demodulation reference signal DMRS is located is less than or equal to a distance between a time-frequency resource on which the channel quality information indicating low channel quality is located and the time-frequency resource on which the DMRS is located.

In view of the above, according to the network device provided in this embodiment of this application, the terminal device can determine the reporting priority according to the reporting priority rule when reporting of the first channel quality information conflicts with reporting of the second channel quality information, and determine the to-be-reported content or the to-be-discarded content based on the reporting priority. This can resolve a problem of relatively low reliability of reporting channel quality information, and improve the reliability of reporting the channel quality information.

It should be noted that, when the terminal device and the network device provided in the foregoing embodiments transmit channel quality information, division of the foregoing functional modules is merely used as an example for description. In actual application, the foregoing functions may be allocated to different functional modules for implementation as required. That is, an internal structure of the terminal device is divided into different functional modules to implement all or a part of the functions described above. In addition, the terminal device and the network device provided in the foregoing embodiments are based on the same concept as the channel quality information transmission method embodiments. For specific implementation processes of the terminal device and the network device, refer to the method embodiments. Details are not described herein again.

Figure 9:
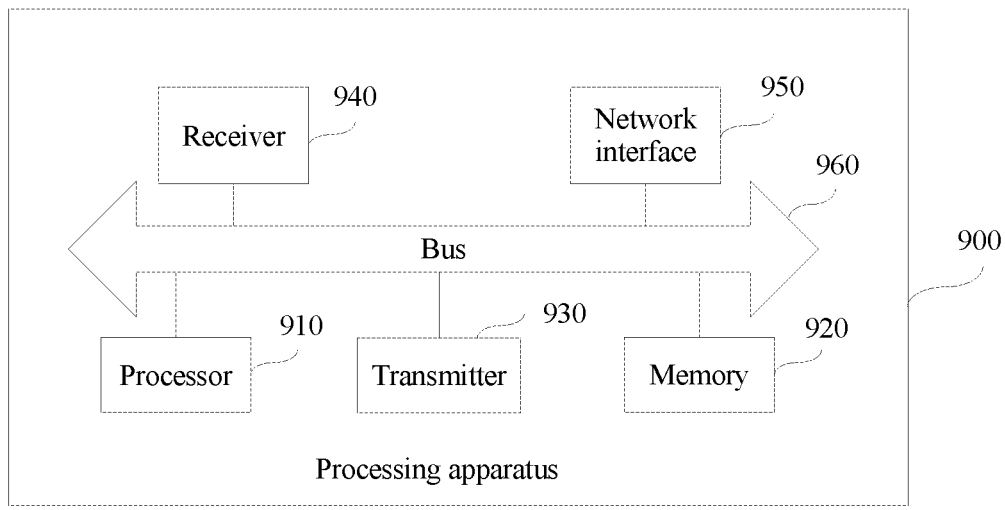
FIG. 9 is a schematic structural diagram of a processing apparatus according to an embodiment of this application.

Referring to FIG. 9, FIG. 9 is a schematic structural diagram of a processing apparatus 900 according to an embodiment of this application. The processing apparatus 900 may be the terminal device 002 in the implementation environment shown in FIG. 1. Referring to FIG. 9, the processing apparatus 900 includes a processor 910 and a memory 920. The processor 910 is configured to execute an instruction stored in the memory 920, and the processor 910 executes the instruction to implement steps related to the channel quality information transmission method in the embodiment shown in FIG. 3 or the channel quality information transmission method provided in the embodiment shown in FIG. 4.

Optionally, as shown in FIG. 9, the processing apparatus 900 further includes a transmitter 930, a receiver 940, and a network interface 950. The processor 910, the memory 920, the transmitter 930, the receiver 940, and the network interface 950 may be connected by using a bus 960. The processor 910 includes one or more processing cores, and the processor 910 performs various function applications and data processing by running a software program. There may be a plurality of network interfaces 950, and the network interface 950 is used by the processing apparatus 900 to communicate with another storage device or a network device. The network interface 950 is optional. In actual application, the processing apparatus 900 may communicate with the another storage device or the network device by using the transmitter 930 and the receiver 940. Therefore, the processing apparatus 900 may not include the network interface. This is not limited in this embodiment of this application.

In this embodiment of this application, the processor 910 executes the instruction to implement a channel quality information transmission method, and the method includes: determining, by a terminal device, a reporting priority of channel quality information according to a reporting priority rule when reporting of first channel quality information conflicts with reporting of second channel quality information, where the channel quality information includes the first channel quality information and the second channel quality information, and the channel quality information indicates channel quality; determining, by the terminal device, to-be-reported content or to-be-discarded content based on the reporting priority of the channel quality information; and reporting, by the terminal device, the to-be-reported content to the network device.

The reporting priority rule includes: when the first channel quality information and the second channel quality information are the same in terms of time domain type and are different in terms of content type, determining the reporting priority of the channel quality information based on a content type of the channel quality information and/or a channel quality level; or when the first channel quality information and the second channel quality information are different in terms of time domain type and are the same or different in terms of content type, determining the reporting priority of the channel quality information based on a time domain type of the channel quality information and/or a channel quality level.

Optionally, before the reporting, by the terminal device, the to-be-reported content to the network device, the method further includes: determining, by the terminal device, a coding scheme and/or a modulation scheme for channel quality information in the to-be-reported content based on a channel quality level indicated by the channel quality information; and coding, by the terminal device, the channel quality information in the to-be-reported content based on the coding scheme; and/or modulating, by the terminal device, the channel quality information in the to-be-reported content based on the modulation scheme.

A coding bit rate of channel quality information indicating high channel quality is less than or equal to a coding bit rate of channel quality information indicating low channel quality; and/or a distance between a time-frequency resource on which the channel quality information indicating high channel quality is located and a time-frequency resource on which a demodulation reference signal DMRS is located is less than or equal to a distance between a time-frequency resource on which the channel quality information indicating low channel quality is located and the time-frequency resource on which the DMRS is located.

In view of the above, according to the processing apparatus provided in this embodiment of this application, the terminal device can determine the reporting priority according to the reporting priority rule when reporting of the first channel quality information conflicts with reporting of the second channel quality information, and determine the to-be-reported content or the to-be-discarded content based on the reporting priority. This can resolve a problem of relatively low reliability of reporting channel quality information, and improve the reliability of reporting the channel quality information.

Figure 10:
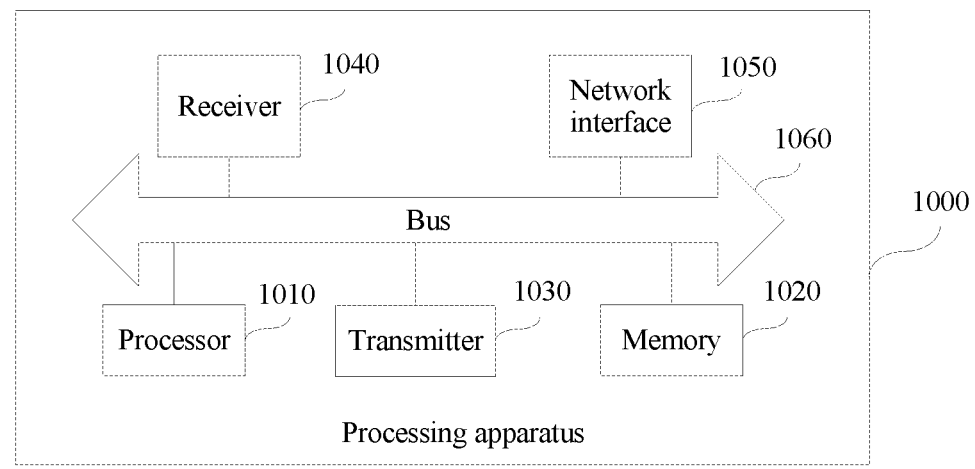
FIG. 10 is a schematic structural diagram of another processing apparatus according to an embodiment of this application.

Referring to FIG. 10, FIG. 10 is a schematic structural diagram of a processing apparatus 1000 according to an embodiment of this application. The processing apparatus 1000 may be the network device 001 in the implementation environment shown in FIG. 1. Referring to FIG. 10, the processing apparatus 1000 includes a processor 1010 and a memory 1020. The processor 1010 is configured to execute an instruction stored in the memory 1020, and the processor 1010 executes the instruction to implement steps related to the channel quality information transmission method provided in the embodiment shown in FIG. 4.

Optionally, as shown in FIG. 10, the processing apparatus 1000 further includes a transmitter 1030, a receiver 1040, and a network interface 1050. The processor 1010, the memory 1020, the transmitter 1030, the receiver 1040, and the network interface 1050 may be connected by using a bus 1060. The processor 1010 includes one or more processing cores, and the processor 1010 performs various function applications and data processing by running a software program. There may be a plurality of network interfaces 1050, and the network interface 1050 is used by the processing apparatus 1000 to communicate with another storage device or a network device. The network interface 1050 is optional. In actual application, the processing apparatus 1000 may communicate with the another storage device or the network device by using the transmitter 1030 and the receiver 1040. Therefore, the processing apparatus 1000 may not include the network interface. This is not limited in this embodiment of this application.

In this embodiment of this application, the processor 1010 executes the instruction to implement a channel quality information transmission method, and the method includes: receiving, by a network device, to-be-reported content reported by a terminal device, where the to-be-reported content is reported by the terminal device to the network device after the terminal device determines a reporting priority of channel quality information according to a reporting priority rule when reporting of first channel quality information conflicts with reporting of second channel quality information, and determines the to-be-reported content or to-be-discarded content based on the reporting priority of the channel quality information, the channel quality information includes the first channel quality information and the second channel quality information, and the channel quality information indicates channel quality; and parsing, by the network device, the to-be-reported content.

The reporting priority rule includes: when the first channel quality information and the second channel quality information are the same in terms of time domain type and are different in terms of content type, determining the reporting priority of the channel quality information based on a content type of the channel quality information and/or a channel quality level; or when the first channel quality information and the second channel quality information are different in terms of time domain type and are the same or different in terms of content type, determining the reporting priority of the channel quality information based on a time domain type of the channel quality information and/or a channel quality level.

Optionally, before the parsing, by the network device, the to-be-reported content, the method further includes: determining, by the network device, a coding scheme and/or a modulation scheme for channel quality information in the to-be-reported content; and demodulating, by the network device, the channel quality information in the to-be-reported content based on the modulation scheme; and/or decoding, by the network device, the channel quality information in the to-be-reported content based on the coding scheme.

A coding bit rate of channel quality information indicating high channel quality is less than or equal to a coding bit rate of channel quality information indicating low channel quality; and/or a distance between a time-frequency resource on which the channel quality information indicating high channel quality is located and a time-frequency resource on which a demodulation reference signal DMRS is located is less than or equal to a distance between a time-frequency resource on which the channel quality information indicating low channel quality is located and the time-frequency resource on which the DMRS is located.

Optionally, in the embodiments shown in FIG. 5 to FIG. 10, a content type of at least one of the first channel quality information or the second channel quality information is a first type.

Optionally, in the embodiments shown in FIG. 5 to FIG. 10, the content type includes a first type and a second type; channel quality information whose content type is the first type includes at least one of an identifier of a reference signal resource or quality information of the reference signal resource, wherein the quality information of the reference signal resource includes at least one of a reference signal received power, reference signal received quality, or a channel quality indicator; and channel quality information whose content type is the second type includes at least one of an identifier of a reference signal resource, a rank indicator, a precoding matrix indicator, or a channel quality indicator.

Optionally, in the embodiments shown in FIG. 5 to FIG. 10, the time domain type includes at least one of periodic reporting, semi-periodic reporting, or aperiodic reporting.

Optionally, in the embodiments shown in FIG. 5 to FIG. 10, the first channel quality information includes N pieces of channel quality information whose content type is the first type, the N pieces of channel quality information include X pieces of channel quality information and Y pieces of channel quality information, and channel quality indicated by any one of the X pieces of channel quality information is higher than or equal to channel quality indicated by any one of the Y pieces of channel quality information, where X+Y≤N, and X, Y, and N all are integers greater than or equal to 1; and the second channel quality information includes M pieces of channel quality information whose content type is the first type, the M pieces of channel quality information include V pieces of channel quality information and Q pieces of channel quality information, and channel quality indicated by any one of the V pieces of channel quality information is higher than or equal to channel quality indicated by any one of the Q pieces of channel quality information, where V+Q≤M, and V, Q, and M all are integers greater than or equal to 1; or the second channel quality information includes K pieces of channel quality information whose content type is the second type, where K is an integer greater than or equal to 1.

Optionally, in the embodiments shown in FIG. 5 to FIG. 10, when the first channel quality information and the second channel quality information are the same in terms of time domain type and are different in terms of content type, a reporting priority of the first type of the X pieces of channel quality information is higher than or equal to a reporting priority of the second type of the second channel quality information, and the reporting priority of the second type of the second channel quality information is higher than or equal to a reporting priority of the first type of the Y pieces of channel quality information; or a reporting priority of the first type of the X pieces of channel quality information is higher than or equal to a reporting priority of the first type of the Y pieces of channel quality information, and the reporting priority of the first type of the Y pieces of channel quality information is higher than or equal to a reporting priority of the second type of the second channel quality information.

Optionally, in the embodiments shown in FIG. 5 to FIG. 10, when the first channel quality information and the second channel quality information are different in terms of time domain type and content type, a reporting priority of the first type of the first channel quality information reported aperiodically is higher than or equal to a reporting priority of the second type of the second channel quality information reported periodically; and/or a reporting priority of the second type of the second channel quality information reported aperiodically is higher than or equal to a reporting priority of the first type of the first channel quality information reported periodically; and/or the reporting priority of the first type of the first channel quality information reported aperiodically is higher than or equal to a reporting priority of the second type of the second channel quality information reported semi-periodically; and/or the reporting priority of the second type of the second channel quality information reported aperiodically is higher than or equal to a reporting priority of the first type of the first channel quality information reported semi-periodically.

Optionally, in the embodiments shown in FIG. 5 to FIG. 10, when the first channel quality information and the second channel quality information are different in terms of time domain type and are the same in terms of content type, a reporting priority of the first type of the first channel quality information reported aperiodically is higher than or equal to a reporting priority of the first type of the first channel quality information reported periodically; and/or the reporting priority of the first type of the first channel quality information reported aperiodically is higher than or equal to a reporting priority of the first type of the first channel quality information reported semi-periodically; and/or the reporting priority of the first type of the first channel quality information reported semi-periodically is higher than or equal to the reporting priority of the first type of the first channel quality information reported periodically; and/or a reporting priority of the first type of the Y pieces of channel quality information reported aperiodically is higher than or equal to a reporting priority of the first type of the Q pieces of channel quality information reported periodically; and/or the reporting priority of the first type of the Y pieces of channel quality information reported aperiodically is higher than or equal to a reporting priority of the first type of the Q pieces of channel quality information reported semi-periodically; and/or a reporting priority of the first type of the Y pieces of channel quality information reported semi-periodically is higher than or equal to the reporting priority of the first type of the Q pieces of channel quality information reported periodically; and/or a reporting priority of the first type of the X pieces of channel quality information reported aperiodically is higher than or equal to a reporting priority of the first type of the V pieces of channel quality information reported periodically; and/or the reporting priority of the first type of the X pieces of channel quality information reported aperiodically is higher than or equal to a reporting priority of the first type of the V pieces of channel quality information reported semi-periodically; and/or a reporting priority of the first type of the X pieces of channel quality information reported semi-periodically is higher than or equal to the reporting priority of the first type of the V pieces of channel quality information reported periodically; and/or a reporting priority of the first type of the X pieces of channel quality information reported periodically is higher than or equal to a reporting priority of the first type of the Q pieces of channel quality information reported aperiodically; and/or the reporting priority of the first type of the X pieces of channel quality information reported semi-periodically is higher than or equal to the reporting priority of the first type of the Q pieces of channel quality information reported aperiodically; and/or the reporting priority of the first type of the X pieces of channel quality information reported periodically is higher than or equal to the reporting priority of the first type of the Q pieces of channel quality information reported semi-periodically.

Optionally, in the embodiments shown in FIG. 5 to FIG. 10, channel quality information on time-frequency resources that are located on two sides of the time-frequency resource on which the DMRS is located and that are at a same distance from the time-frequency resource on which the DMRS is located is the same.

An embodiment of this application further provides a channel quality information transmission system, and the channel quality information transmission system includes a terminal device and a network device. In a possible implementation, the terminal device is the terminal device shown in FIG. 5 or FIG. 6, and the network device is the network device shown in FIG. 7 or FIG. 8. In another possible implementation, the terminal device is the terminal device shown in FIG. 9, and the network device is the network device shown in FIG. 10.

An embodiment of this application further provides a processing apparatus. The processing apparatus includes at least one circuit, and the at least one circuit is configured to perform steps related to the terminal device in the channel quality information transmission method shown in FIG. 3 and the channel quality information transmission method shown in FIG. 4.

An embodiment of this application further provides a processing apparatus. The processing apparatus includes at least one circuit, and the at least one circuit is configured to perform steps related to the network device in the channel quality information transmission method shown in FIG. 4.

An embodiment of this application further provides a computer readable storage medium. The computer readable storage medium stores an instruction, and when the instruction runs on a processing component of a computer, the processing component is enabled to perform steps related to the terminal device in the channel quality information transmission method shown in FIG. 3 and the channel quality information transmission method shown in FIG. 4.

An embodiment of this application further provides a computer readable storage medium. The computer readable storage medium stores an instruction, and when the instruction runs on a processing component of a computer, the processing component is enabled to perform steps related to the network device in the channel quality information transmission method shown in FIG. 4.

An embodiment of this application further provides a computer program product including an instruction. When the computer program product runs on a processing component of a computer, the processing component is enabled to perform steps related to the terminal device in the channel quality information transmission method shown in FIG. 3 and the channel quality information transmission method shown in FIG. 4.

An embodiment of this application further provides a computer program product including an instruction. When the computer program product runs on a processing component of a computer, the processing component is enabled to perform steps related to the network device in the channel quality information transmission method shown in FIG. 4.

An embodiment of this application further provides a chip. The chip includes a programmable logic circuit and/or a program instruction, and when the chip runs, the chip is configured to implement steps related to the terminal device in the channel quality information transmission method shown in FIG. 3 and the channel quality information transmission method shown in FIG. 4.

An embodiment of this application further provides a chip. The chip includes a programmable logic circuit and/or a program instruction, and when the chip runs, the chip is configured to implement steps related to the network device in the channel quality information transmission method shown in FIG. 4.

An embodiment of this application further provides a processing apparatus, and the apparatus is configured to implement a part or all of the methods provided in the foregoing embodiments.

The term "and/or" in this application describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

The sequence numbers of the foregoing embodiments of this application are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A channel quality information transmission method carried out by a terminal device, the method comprising:

determining a reporting priority of a third channel quality information according to a reporting priority rule in accordance with a conflict occurring during a reporting of a first channel quality information and a reporting of a second channel quality information, wherein the third channel quality information comprises the first channel quality information and the second channel quality information, and wherein the third channel quality information indicates a channel quality;

determining a to-be-reported content or a to-be-discarded content based on the reporting priority of the third channel quality information; and reporting the to-be-reported content to a network device, wherein before the reporting the to-be-reported content to the network device, the method further comprises:

determining a first coding scheme for a fourth channel quality information based on a first channel quality level indicated by the fourth channel quality information;

separately determining a second coding scheme for a fifth channel quality information based on a second channel quality level indicated by the fifth channel quality information, wherein the fourth channel quality information and the fifth channel quality information are contained in the to-be-reported content, wherein the first channel quality level is higher than the second channel quality level, and wherein the first coding scheme for the fourth channel quality information has a lower coding rate than the second coding scheme for the fifth channel quality information;

coding the fourth channel quality information based on the first coding scheme; and coding the fifth channel quality information based on the second coding scheme, wherein a first distance between a first time-frequency resource on which the fourth channel quality information indicating the first channel quality level is located and a second time-frequency resource on which a demodulation reference signal (DMRS) is located is less than a second distance between a third time-frequency resource on which the fifth channel quality information indicating the second channel quality is located and the second time-frequency resource on which the DMRS is located.

2. The method according to claim 1, wherein a content type of at least one of the first channel quality information or the second channel quality information is a first type.

3. The method according to claim 1, wherein the content type comprises a first type and a second type,
wherein the channel quality information whose content type is the first type comprises at least one of:
an identifier of a reference signal resource, or
a quality information of the reference signal resource;
wherein the channel quality information of the reference signal resource comprises at least one of:
a reference signal received power,
a reference signal received quality, or
a channel quality indicator; and
wherein channel quality information whose content type is the second type comprises at least one of:
an identifier of a reference signal resource,
a rank indicator,
a precoding matrix indicator, or
a channel quality indicator.

4. The method according to claim 1, wherein when the first channel quality information and the second channel quality information are different in terms of reporting type and content type, at least one of the following rules exist:
a reporting priority of the first type of the first channel quality information reported aperiodically is higher than or equal to a reporting priority of the second type of the second channel quality information reported periodically;
a reporting priority of the second type of the second channel quality information reported aperiodically is higher than or equal to a reporting priority of the first type of the first channel quality information reported periodically;
the reporting priority of the first type of the first channel quality information reported aperiodically is higher than or equal to a reporting priority of the second type of the second channel quality information reported semi-periodically; or
the reporting priority of the second type of the second channel quality information reported aperiodically is higher than or equal to a reporting priority of the first type of the first channel quality information reported semi-periodically.

5. The method according to claim 1, wherein channel quality information on time-frequency resources that are located on two sides of the time-frequency resource on which the DMRS is located and that are at a same distance from the time-frequency resource on which the DMRS is located is the same.

6. The method of claim 1, wherein the reporting priority rule comprises:
assigning a highest reporting priority to the channel quality information of an aperiodic reporting type in accordance with the first channel quality information and the second channel quality information being different in terms of both a reporting type and a content type, wherein a set of potential reporting types includes:
a periodic reporting type,
a semi-periodic reporting type, and
the aperiodic reporting type.

7. A channel quality information transmission method carried out by a network device, the method comprising:
receiving a to-be-reported content reported by a terminal device, wherein the to-be-reported content is reported by the terminal device to the network device after the terminal device:
determines a reporting priority of a third channel quality information according to a reporting priority rule in accordance with a conflict occurring during a reporting of a first channel quality information and a reporting of a second channel quality information, wherein the third channel quality information comprises the first channel quality information and the second channel quality information, and wherein the third channel quality information indicates a channel quality;
determines the to-be-reported content or a to-be-discarded content based on the reporting priority of the third channel quality information, the channel quality information comprises the first channel quality information and the second channel quality information, and the channel quality information indicates channel quality; and
before reporting the to-be-reported content to the network device, the terminal device:
determines a first coding scheme for a fourth channel quality information based on a first channel quality level indicated by the fourth channel quality information;
separately determines a second coding scheme for a fifth channel quality information based on a second channel quality level indicated by the fifth channel quality information, wherein the fourth channel quality information and the fifth channel quality information are contained in the to-be-reported content, wherein the first channel quality level is higher than the second channel quality level, and wherein the first coding scheme for the fourth channel quality information has a lower coding rate than the second coding scheme for the fifth channel quality information;
codes the fourth channel quality information based on the first coding scheme; and
codes the fifth channel quality information based on the second coding scheme;
wherein a first distance between a first time-frequency resource on which the fourth channel quality information indicating the first channel quality level is located and a second time-frequency resource on which a demodulation reference signal (DMRS) is located is less than a second distance between a third time-frequency resource on which the fifth channel quality information indicating the second channel quality is located and the second time-frequency resource on which the DMRS is located;
parsing the to-be-reported content.

8. The method according to claim 7, wherein the content type comprises a first type and a second type;
wherein the channel quality information whose content type is the first type comprises at least one of:
an identifier of a reference signal resource, or
a quality information of the reference signal resources;
wherein the channel quality information of the reference signal resource comprises at least one of:
a reference signal received power,
a reference signal received quality, or
a channel quality indicator; and
wherein channel quality information whose content type is the second type comprises at least one of:

an identifier of a reference signal resource,
a rank indicator,
a precoding matrix indicator, or
a channel quality indicator.

9. The method of claim 7, wherein the reporting priority rule comprises:
assigning a highest reporting priority to the channel quality information of an aperiodic reporting type in accordance with the first channel quality information and the second channel quality information being different in terms of both a reporting type and a content type, wherein a set of potential reporting types includes:
a periodic reporting type,
a semi-periodic reporting type, and
the aperiodic reporting type.

10. A terminal device, comprising: a processor and a transmitter,
wherein the processor is configured to carry out operations comprising:
determining a reporting priority of a third channel quality information according to a reporting priority rule in accordance with a conflict occurring during a reporting of a first channel quality information and a reporting of a second channel quality information, wherein the third channel quality information comprises the first channel quality information and the second channel quality information, and wherein the third channel quality information indicates a channel quality;
determining a to-be-reported content or a to-be-discarded content based on the reporting priority of the third channel quality information; and
wherein the transmitter is configured cooperatively operate with the processor to carry out reporting the to-be-reported content to a network device;
wherein before the reporting the to-be-reported content to the network device, the method further comprises:
determining a first coding scheme for a fourth channel quality information based on a first channel quality level indicated by the fourth channel quality information;
separately determining a second coding scheme for a fifth channel quality information based on a second channel quality level indicated by the fifth channel quality information, wherein the fourth channel quality information and the fifth channel quality information are contained in the to-be-reported content, wherein the first channel quality level is higher than the second channel quality level, and wherein the first coding scheme for the fourth channel quality information has a lower coding rate than the second coding scheme for the fifth channel quality information;
coding the fourth channel quality information based on the first coding scheme; and
coding the fifth channel quality information based on the second coding scheme,
wherein a first distance between a first time-frequency resource on which the fourth channel quality information indicating the first channel quality level is located and a second time-frequency resource on which a demodulation reference signal (DMRS) is located is less than a second distance between a third time-frequency resource on which the fifth channel quality information indicating the second channel quality is located and the second time-frequency resource on which the DMRS is located.

11. The terminal device according to claim 10, wherein a content type of at least one of the first channel quality information or the second channel quality information is a first type.

12. The terminal device according to claim 10, wherein the content type comprises a first type and a second type,
wherein the channel quality information whose content type is the first type comprises at least one of:
an identifier of a reference signal resource, or
quality information of the reference signal resource;
wherein the quality information of the reference signal resource comprises at least one of:
a reference signal received power,
reference signal received quality, or
a channel quality indicator;
wherein channel quality information whose content type is the second type comprises at least one of:
an identifier of a reference signal resource,
a rank indicator,
a precoding matrix indicator, or
a channel quality indicator.

13. The terminal device according to claim 10, wherein when the first channel quality information and the second channel quality information are different in terms of reporting type and content type, the at least one of following rules exist:
a reporting priority of the first type of the first channel quality information reported aperiodically is higher than or equal to a reporting priority of the second type of the second channel quality information reported periodically;
a reporting priority of the second type of the second channel quality information reported aperiodically is higher than or equal to a reporting priority of the first type of the first channel quality information reported periodically;
the reporting priority of the first type of the first channel quality information reported aperiodically is higher than or equal to a reporting priority of the second type of the second channel quality information reported semi-periodically; or
the reporting priority of the second type of the second channel quality information reported aperiodically is higher than or equal to a reporting priority of the first type of the first channel quality information reported semi-periodically.

14. The terminal device according to claim 10, wherein channel quality information on time-frequency resources that are located on two sides of the time-frequency resource on which the DMRS is located and that are at a same distance from the time-frequency resource on which the DMRS is located is the same.

15. The terminal device of claim 10, wherein the reporting priority rule comprises:
assigning a highest reporting priority to the channel quality information of an aperiodic reporting type in accordance with the first channel quality information and the second channel quality information being different in terms of both a reporting type and a content type, wherein a set of potential reporting types includes:
a periodic reporting type,
a semi-periodic reporting type, and
the aperiodic reporting type.

16. A network device, comprising a processor and a receiver, wherein the receiver is configured to:
  receive a to-be-reported content reported by a terminal device, wherein the to-be-reported content is reported by the terminal device to the network device after the terminal device:
    determines a reporting priority of a third channel quality information according to a reporting priority rule in accordance with a conflict occurring during a reporting of a first channel quality information and a reporting of a second channel quality information, wherein the third channel quality information comprises the first channel quality information and the second channel quality information, and wherein the third channel quality information indicates a channel quality;
    determines the to-be-reported content or a to-be-discarded content based on the reporting priority of the third channel quality information, the channel quality information comprises the first channel quality information and the second channel quality information, and the channel quality information indicates channel quality; and
  before reporting the to-be-reported content to the network device, the terminal device:
    determines a first coding scheme for a fourth channel quality information based on a first channel quality level indicated by the fourth channel quality information;
    separately determines a second coding scheme for a fifth channel quality information based on a second channel quality level indicated by the fifth channel quality information, wherein the fourth channel quality information and the fifth channel quality information are contained in the to-be-reported content, wherein the first channel quality level is higher than the second channel quality level, and wherein the first coding scheme for the fourth channel quality information has a lower coding rate than the second coding scheme for the fifth channel quality information;
    codes the fourth channel quality information based on the first coding scheme; and
    codes the fifth channel quality information based on the second coding scheme;
  wherein a first distance between a first time-frequency resource on which the fourth channel quality information indicating the first channel quality level is located and a second time-frequency resource on which a demodulation reference signal (DMRS) is located is less than a second distance between a third time-frequency resource on which the fifth channel quality information indicating the second channel quality is located and the second time-frequency resource on which the DMRS is located; and
  wherein the processor is configured to parse the to-be-reported content to obtain the channel quality information.

17. The network device according to claim 16, wherein the content type comprises a first type and a second type;
  wherein channel quality information whose content type is the first type comprises at least one of:
    an identifier of a reference signal resource, or
    quality information of the reference signal resource,
  wherein the quality information of the reference signal resource comprises at least one of:
    a reference signal received power,
    reference signal received quality, or
    a channel quality indicator;
  wherein channel quality information whose content type is the second type comprises at least one of:
    an identifier of a reference signal resource,
    a rank indicator,
    a precoding matrix indicator, or
    a channel quality indicator.

18. The network device according to claim 16, wherein the reporting priority rule comprises:
  assigning a highest reporting priority to the channel quality information of an aperiodic reporting type in accordance with the first channel quality information and the second channel quality information being different in terms of both a reporting type and a content type, wherein a set of potential reporting types includes:
    a periodic reporting type,
    a semi-periodic reporting type, and
    the aperiodic reporting type.

* * * * *

UNITED STATES PATENT AND TRADEMARK OFFICE
CERTIFICATE OF CORRECTION

| | |
|---|---|
| PATENT NO. | : 11,096,185 B2 |
| APPLICATION NO. | : 16/688670 |
| DATED | : August 17, 2021 |
| INVENTOR(S) | : Zhang et al. |

It is certified that error appears in the above-identified patent and that said Letters Patent is hereby corrected as shown below:

In the Claims

Claim 8: Column 60, Line 60: "a quality information of the reference signal resources;" should read -- a quality information of the reference signal resource; --.

Signed and Sealed this
Twelfth Day of July, 2022

Katherine Kelly Vidal
*Director of the United States Patent and Trademark Office*